(12) United States Patent
Tsukagoshi

(10) Patent No.: US 11,533,522 B2
(45) Date of Patent: Dec. 20, 2022

(54) TRANSMISSION APPARATUS, TRANSMISSION METHOD, RECEPTION APPARATUS, AND RECEPTION METHOD

(71) Applicant: SATURN LICENSING LLC, New York, NY (US)

(72) Inventor: Ikuo Tsukagoshi, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 241 days.

(21) Appl. No.: 16/490,715

(22) PCT Filed: Apr. 19, 2018

(86) PCT No.: PCT/JP2018/016063
§ 371 (c)(1),
(2) Date: Sep. 3, 2019

(87) PCT Pub. No.: WO2018/198914
PCT Pub. Date: Nov. 1, 2018

(65) Prior Publication Data
US 2020/0021869 A1 Jan. 16, 2020

(30) Foreign Application Priority Data
Apr. 24, 2017 (JP) .............................. JP2017-085730

(51) Int. Cl.
*H04N 21/2343* (2011.01)
*H04N 19/30* (2014.01)
(Continued)

(52) U.S. Cl.
CPC . *H04N 21/234381* (2013.01); *H04N 5/23232* (2013.01); *H04N 19/30* (2014.11); *H04N 21/236* (2013.01); *H04N 21/2662* (2013.01)

(58) Field of Classification Search
CPC ............... H04N 19/30; H04N 21/2343; H04N 21/234381; H04N 21/236; H04N 21/2662; H04N 5/23232
See application file for complete search history.

(56) References Cited

U.S. PATENT DOCUMENTS 5,797,041 A * 8/1998 Yasue .................... G06F 13/128
709/250
6,198,505 B1 * 3/2001 Turner ................. H04N 5/3415
348/222.1
(Continued)

FOREIGN PATENT DOCUMENTS

EP 3 349 456 A1 7/2018
EP 2 688 304 B1 9/2019
(Continued)

OTHER PUBLICATIONS

International Search Report dated Jul. 10, 2018 in PCT/JP2018/016063 filed Apr. 19, 2018.

*Primary Examiner* — Shawn S An
(74) *Attorney, Agent, or Firm* — Chris Kolefas

(57) ABSTRACT

There is provided a transmission apparatus including: a processing unit that performs processing of mixing, at a mixing rate independent for each frame, image data in peripheral frames with image data in each frame of first moving image data at a first frame rate and obtains second moving image data at the first frame rate. At least image data in a frame corresponding to a second frame rate that is lower than the first frame rate in the image data in each frame that forms the second moving image data is brought into a state in which the image data is mixed with the image data in the peripheral frames.

13 Claims, 24 Drawing Sheets

(51) Int. Cl.
*H04N 5/232* (2006.01)
*H04N 21/236* (2011.01)
*H04N 21/2662* (2011.01)

(56) References Cited

U.S. PATENT DOCUMENTS

| | | | |
|---|---|---|---|
| 2002/0030751 A1* | 3/2002 | Takane | H04N 5/232411 348/222.1 |
| 2004/0240543 A1 | 12/2004 | Faroudja | |
| 2005/0036704 A1 | 2/2005 | Dumitras et al. | |
| 2008/0158386 A1* | 7/2008 | Miki | H04N 5/2354 348/E5.007 |
| 2008/0247462 A1* | 10/2008 | Demos | H04N 19/63 375/240.03 |
| 2008/0284904 A1 | 11/2008 | Dumitras et al. | |
| 2008/0292201 A1 | 11/2008 | Dumitras et al. | |
| 2009/0180761 A1 | 7/2009 | Wand et al. | |
| 2010/0238792 A1* | 9/2010 | Togo | H04N 21/84 370/216 |
| 2010/0265353 A1* | 10/2010 | Koyama | H04N 5/2621 348/222.1 |
| 2011/0243471 A1* | 10/2011 | Alshina | H04N 19/48 382/248 |
| 2012/0030682 A1* | 2/2012 | Shaffer | H04N 21/23418 718/103 |
| 2013/0187962 A1* | 7/2013 | Vieri | G09G 3/20 345/698 |
| 2014/0071236 A1 | 3/2014 | Tsukagoshi | |
| 2014/0092994 A1* | 4/2014 | Wang | H04N 19/40 375/240.26 |
| 2014/0098886 A1 | 4/2014 | Crenshaw et al. | |
| 2014/0104492 A1 | 4/2014 | Liu et al. | |
| 2014/0286415 A1 | 9/2014 | Kang et al. | |
| 2015/0168946 A1* | 6/2015 | Duvvuri | G05B 19/41855 700/20 |
| 2015/0229878 A1 | 8/2015 | Hwang et al. | |
| 2015/0281752 A1* | 10/2015 | Van Veldhuisen | H04N 21/233 725/116 |
| 2016/0360178 A1 | 12/2016 | Tsukagoshi | |
| 2018/0199078 A1* | 7/2018 | Beattie, Jr. | H04N 21/2343 |
| 2018/0213242 A1 | 7/2018 | Tsukagoshi | |
| 2018/0220129 A1 | 8/2018 | Peng et al. | |
| 2019/0297283 A1* | 9/2019 | Douady | G06T 7/00 |
| 2019/0394475 A1* | 12/2019 | Toma | H04N 21/242 |

FOREIGN PATENT DOCUMENTS

| | | |
|---|---|---|
| JP | 2007-150432 A | 6/2017 |
| WO | WO 2009/133403 A2 | 11/2009 |
| WO | WO 2012/166512 A2 | 12/2012 |
| WO | WO 2015/076277 A1 | 5/2015 |
| WO | WO 2016/136470 A1 | 9/2016 |
| WO | WO 2017/033748 A1 | 3/2017 |
| WO | WO 2017/038800 A1 | 3/2017 |

\* cited by examiner

[FIG. 1]
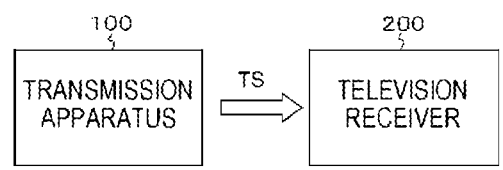
[FIG. 2]
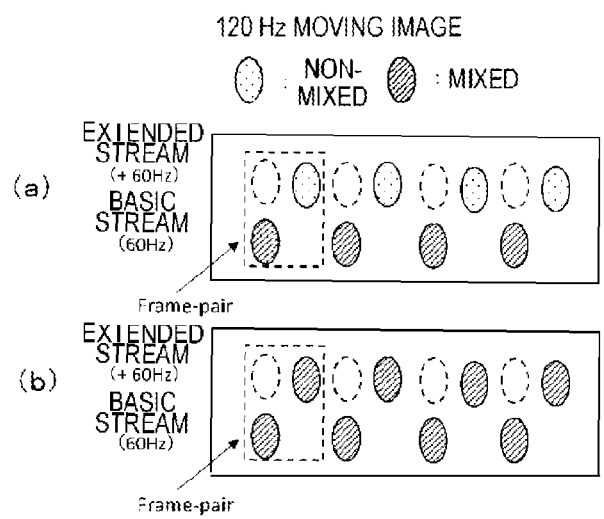

[FIG. 3]
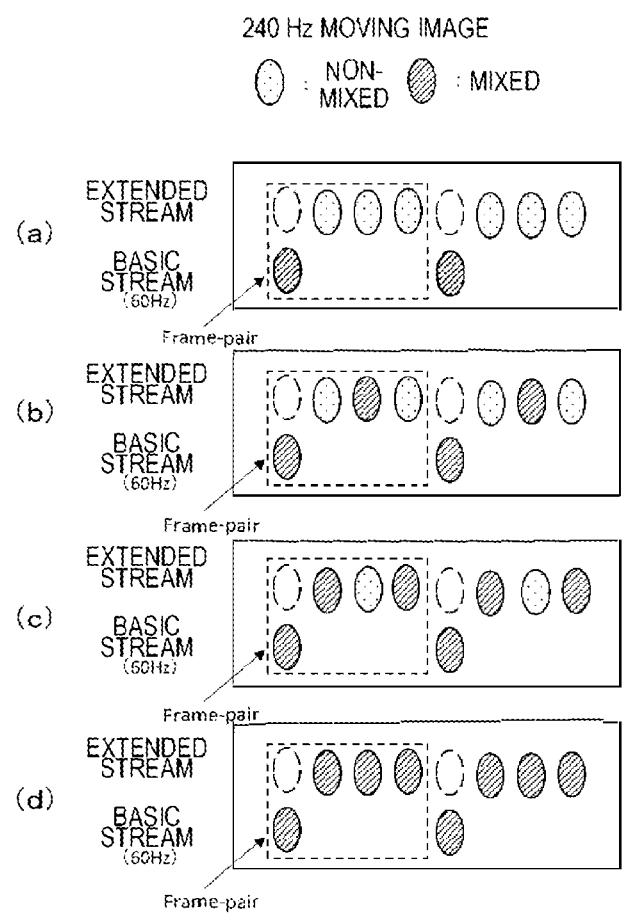

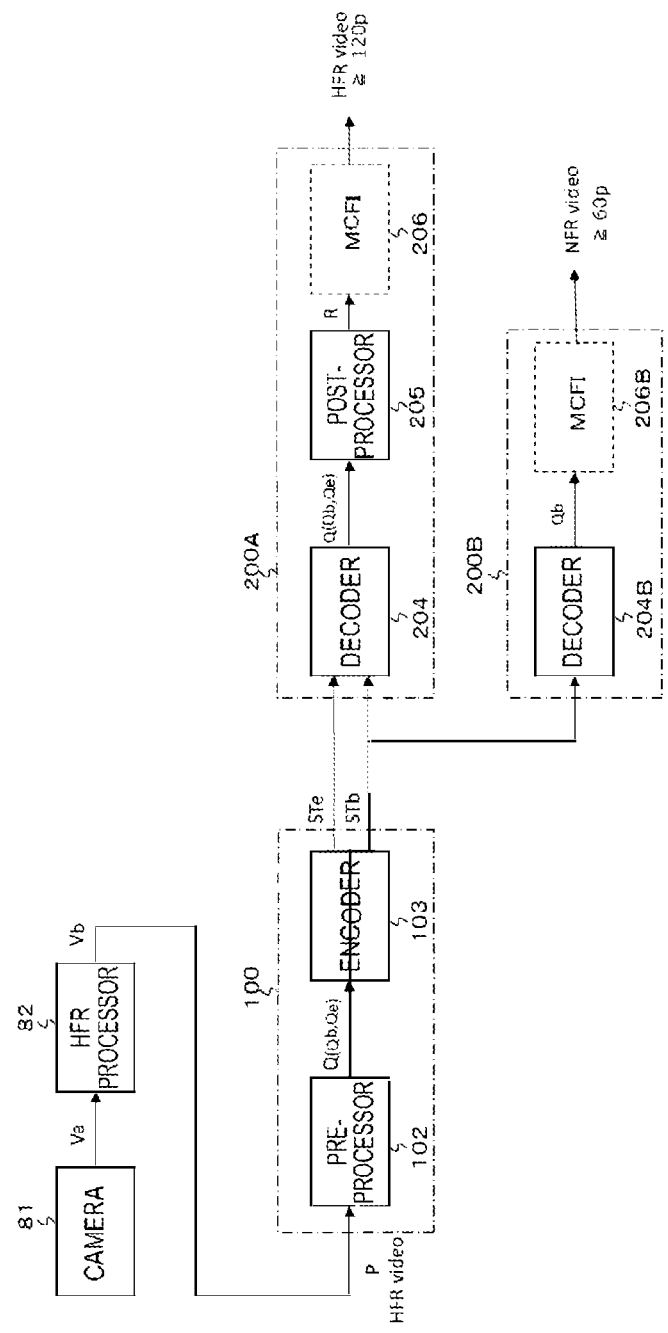

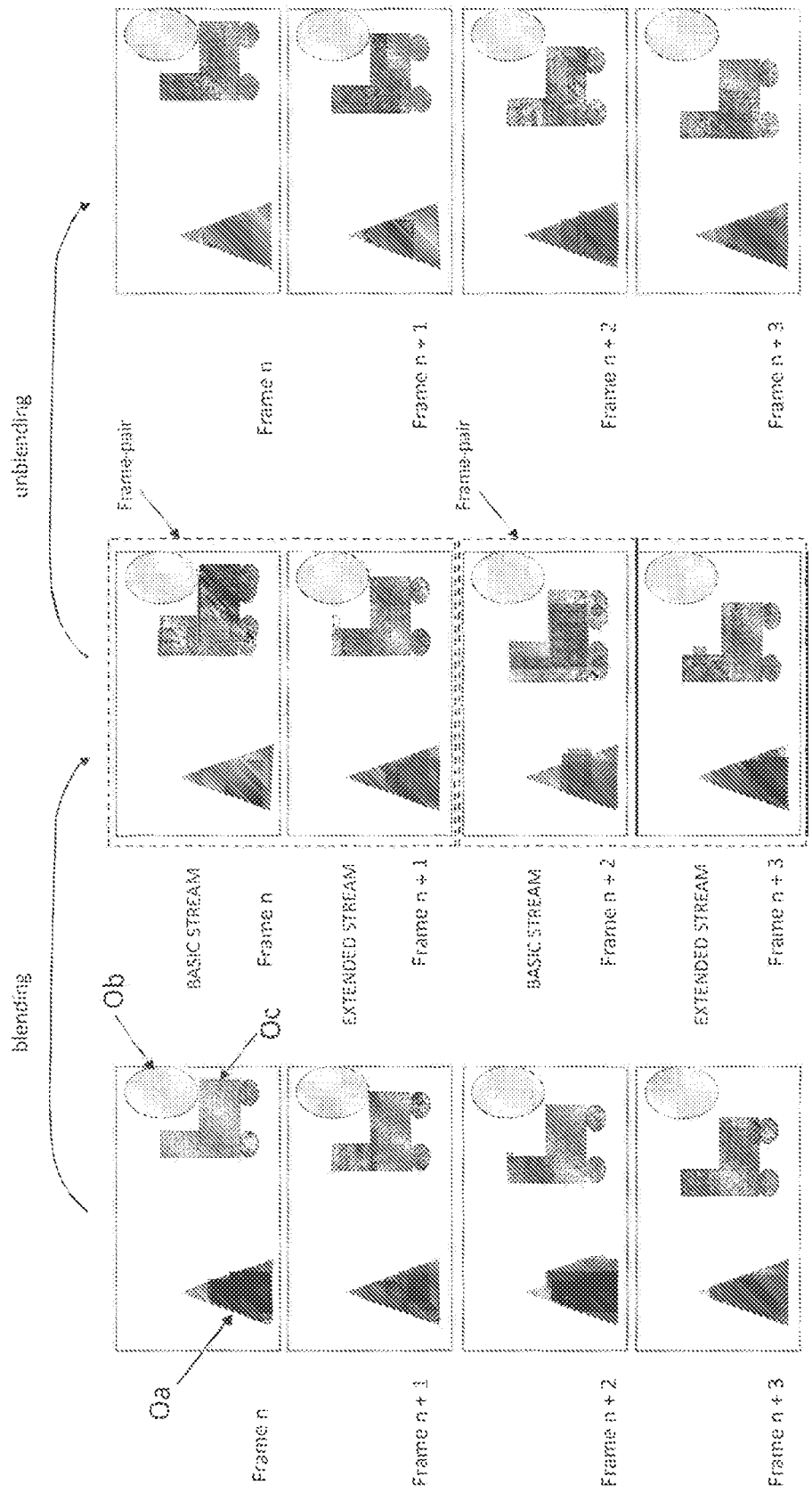

[FIG. 7]
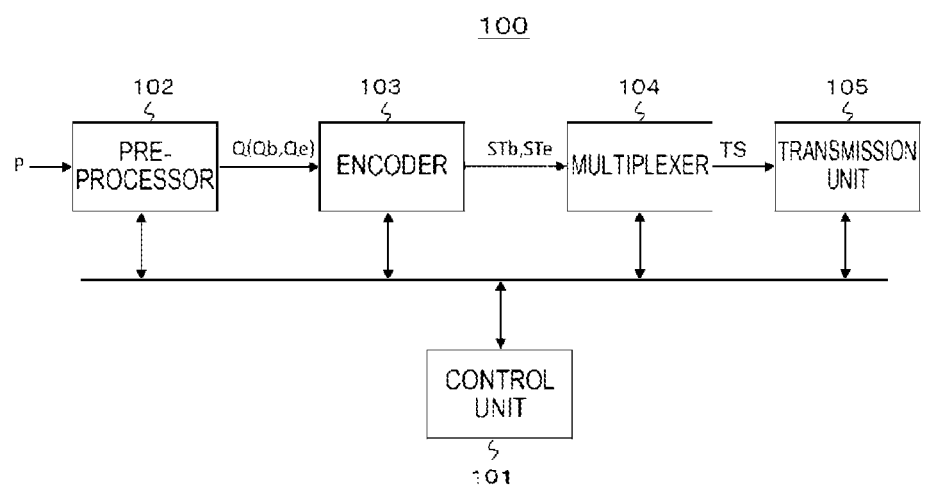
[FIG. 8]
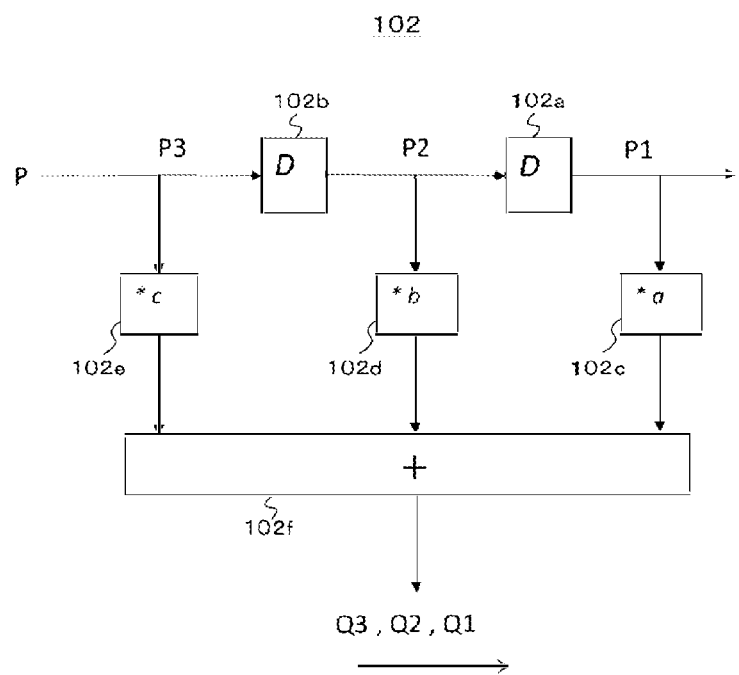

[FIG. 9]
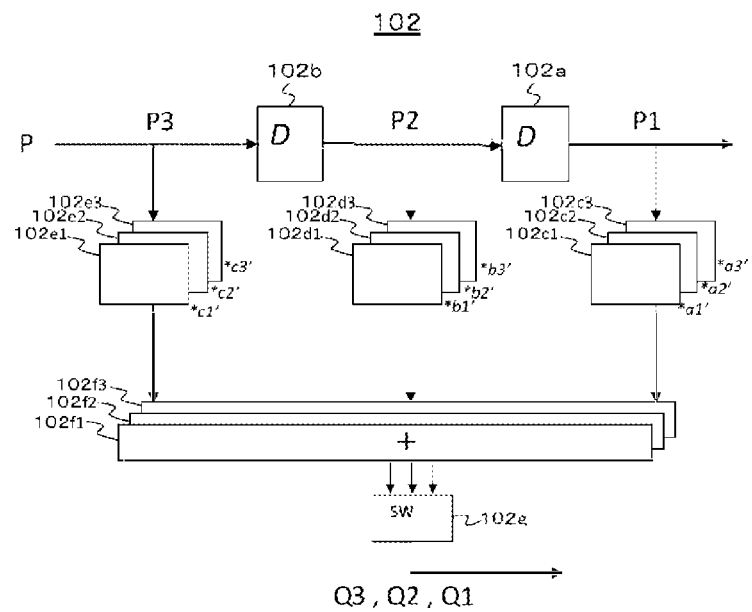
[FIG. 10]
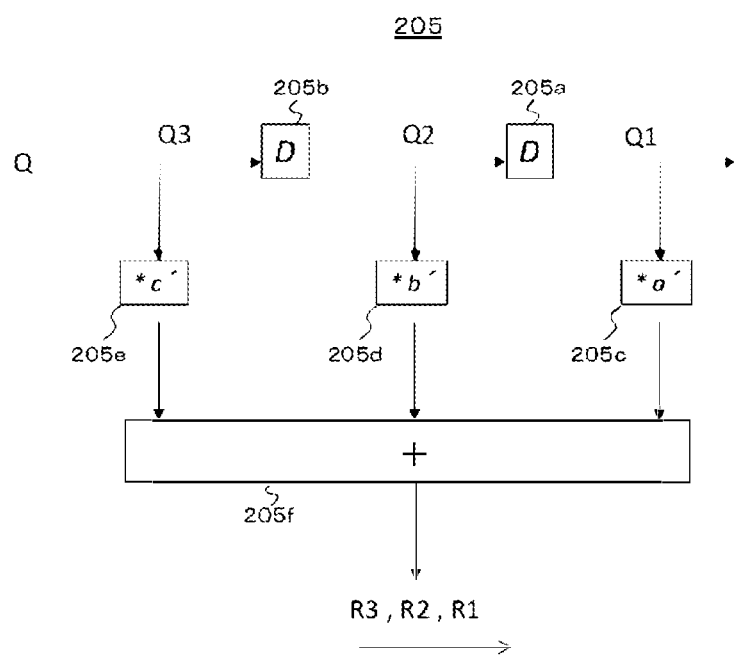

[FIG. 11]
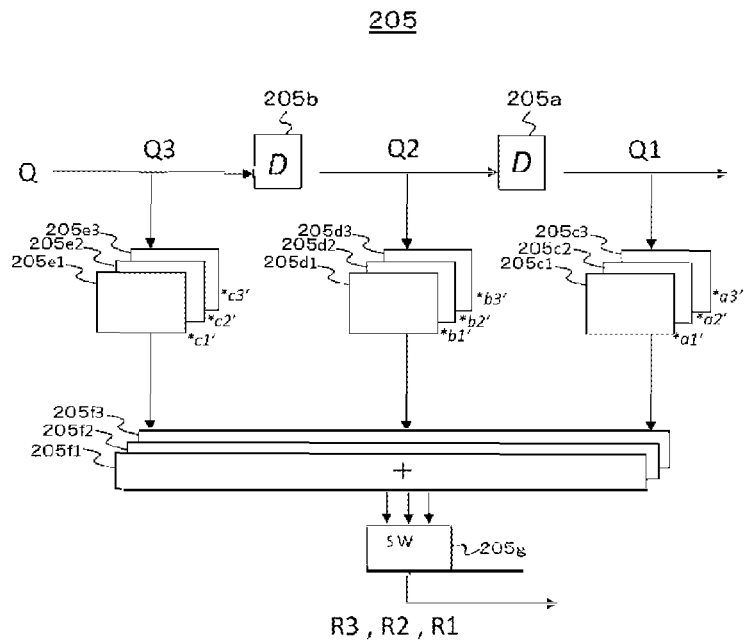
[FIG. 12]
Blending_Information SEI Syntax
(a)
| Syntax | No. of Bits | Format |
|---|---|---|
| user_data_unregistered (size) { | | |
| uuid_iso_iec_11578 | 128 | uimsbf |
| for( i = 16; i < payloadSize; i++ ) | | |
| user_data_payload_byte | 8 | bslbf |
| } | | |
(b)
| Syntax | No. of Bits | Format |
|---|---|---|
| Blending_information_SEI ( ) { | | |
| userdata_id | 16 | uimsbf |
| Blending_information SEI_length | 8 | uimsbf |
| Blending_information () | | |
| } | | |

[FIG. 13]

| Syntax | No. of Bits | Format |
|---|---|---|
| Blending_information ( ) { | | |
| blending_information_id | | ue(v) |
| frame_rate | 3 | uimsbf |
| blending_flag | 1 | bslbf |
| temporal_filter_taps | 2 | uimsbf |
| first_frame_in_frame-pair_flag | 1 | bslbf |
| reserved | 1 | 0x0 |
| blending_refresh_distance | 3 | uimsbf |
| refresh_flag | 1 | bslbf |
| reserved | 4 | 0x0 |
| for ( j = 0 ; j < temporal_filter_taps + 2 ; j++ ) { | | |
| blend_coefficient | 8 | uimsbf |
| } | | |
| } | | |

[FIG. 14]

```
frame Rate (3bits)
    0           50Hz
    1           60Hz
    2           100Hz
    3           120Hz
    4           200Hz
    5           240Hz
    others      reserved blending_flag (1bit)
    0           blending is not applied
    1           blending is applied temporal filter taps (2bits)
    0           2 frames
    1           3 frames
    2           4 frames
    3           5 frames FF (1bit)      (first_frame_in_frame-pair_flag)
    0           represents that frame is other than 1st frame
    1           represents that frame is 1st frame BR distance (3bits)    represents temporal distance until blending refresh is performed
    0           1 frames
    1           2 frames
    2           3 frames
    3           4 frames
    4           5 frames
    others      reserved refresh_flag (1bit)    represents that frame is target of blend refreshing
    0           blending is not refreshed
    1           blending is refreshed; that is, temporarily previous
                frames of frame are not used Blend_coefficient (8bits)    coefficient (blending ratio)
    0x0         0
    0x1         1/5
    0x2         1/4
    0x3         1/3
    0x4         1/2
    0x5         2/3
    0x6         3/4
    0x7         4/5
    0x8         1
    others      reserved
```

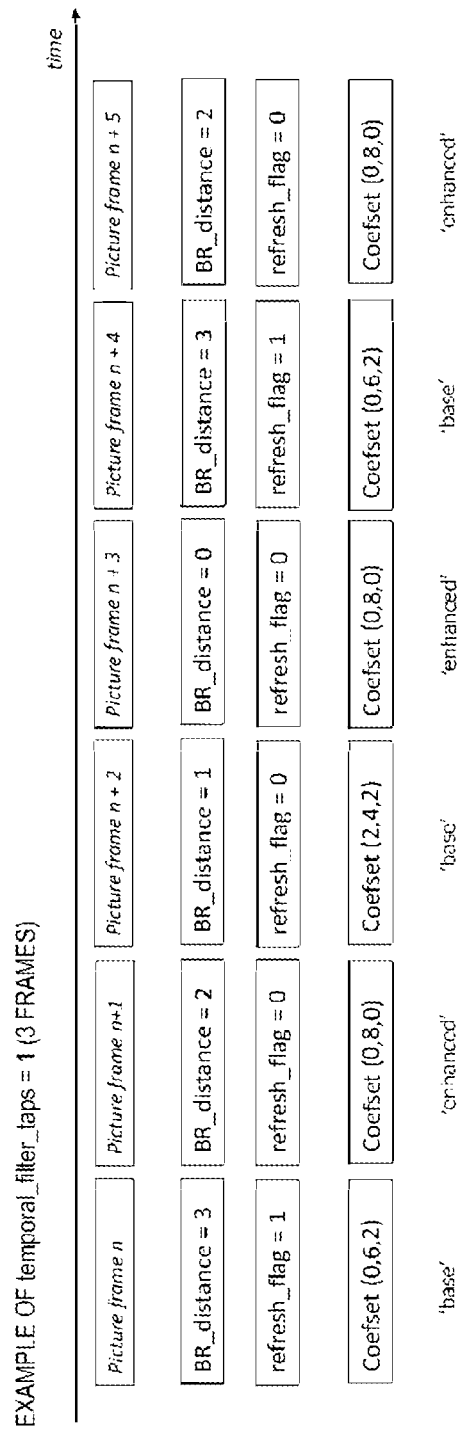
[FIG. 15]

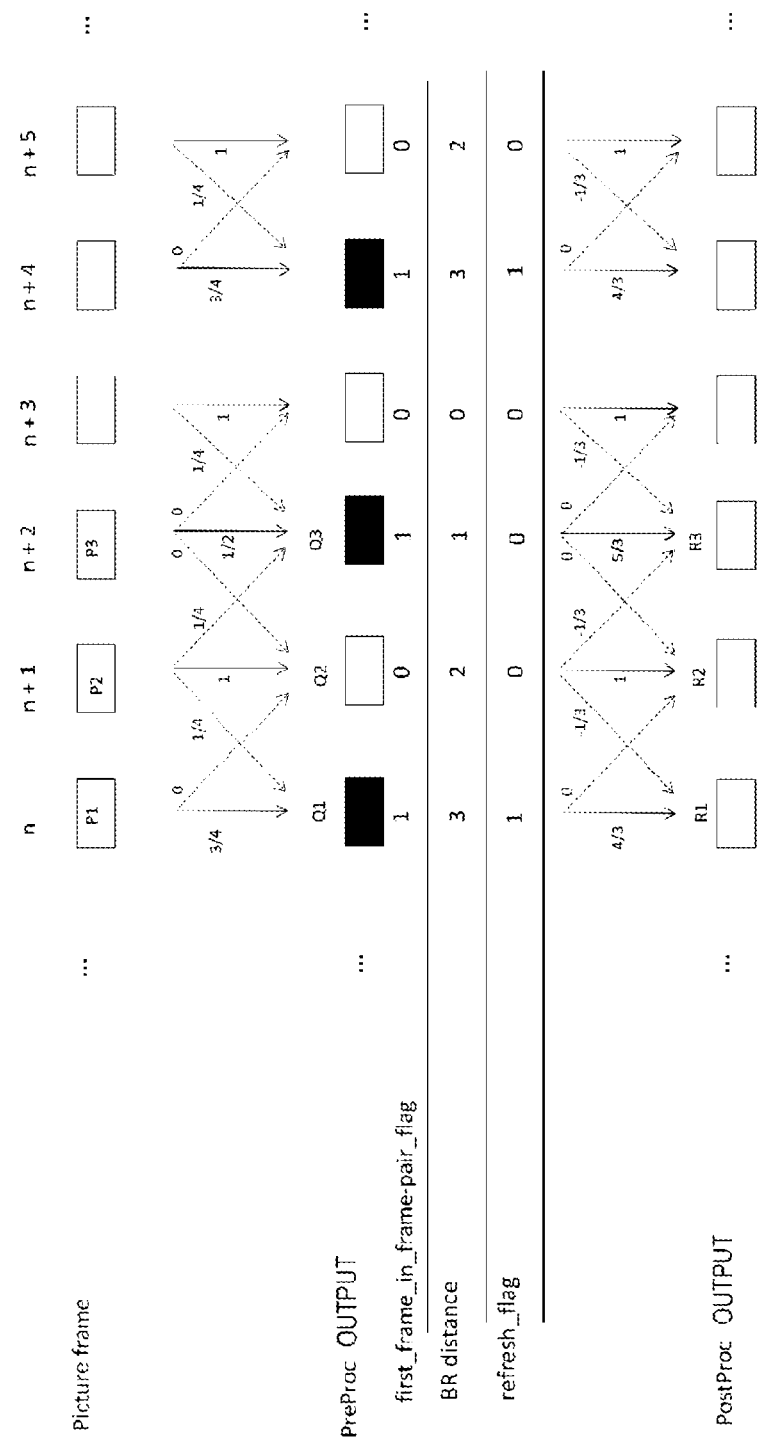
[FIG. 16]

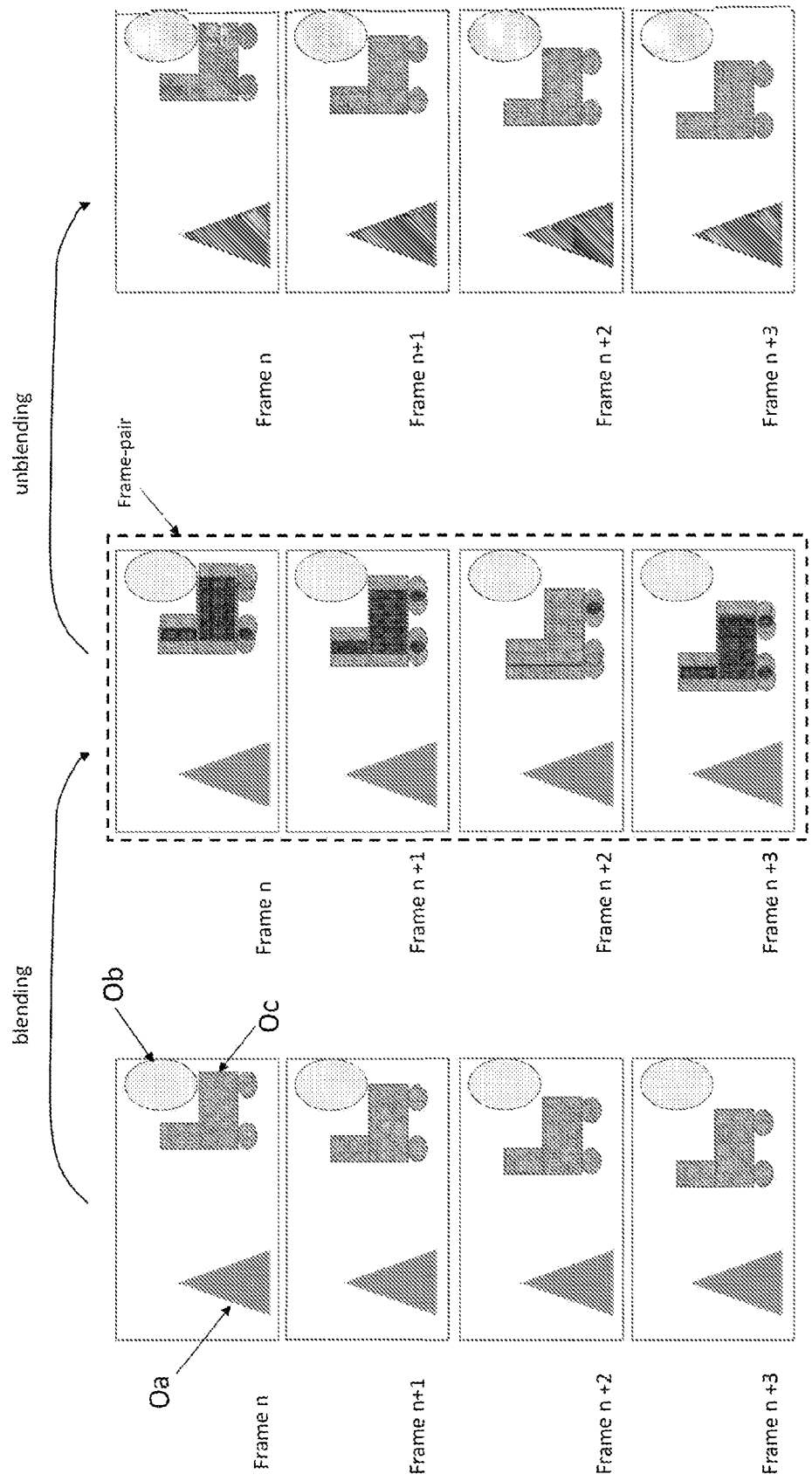

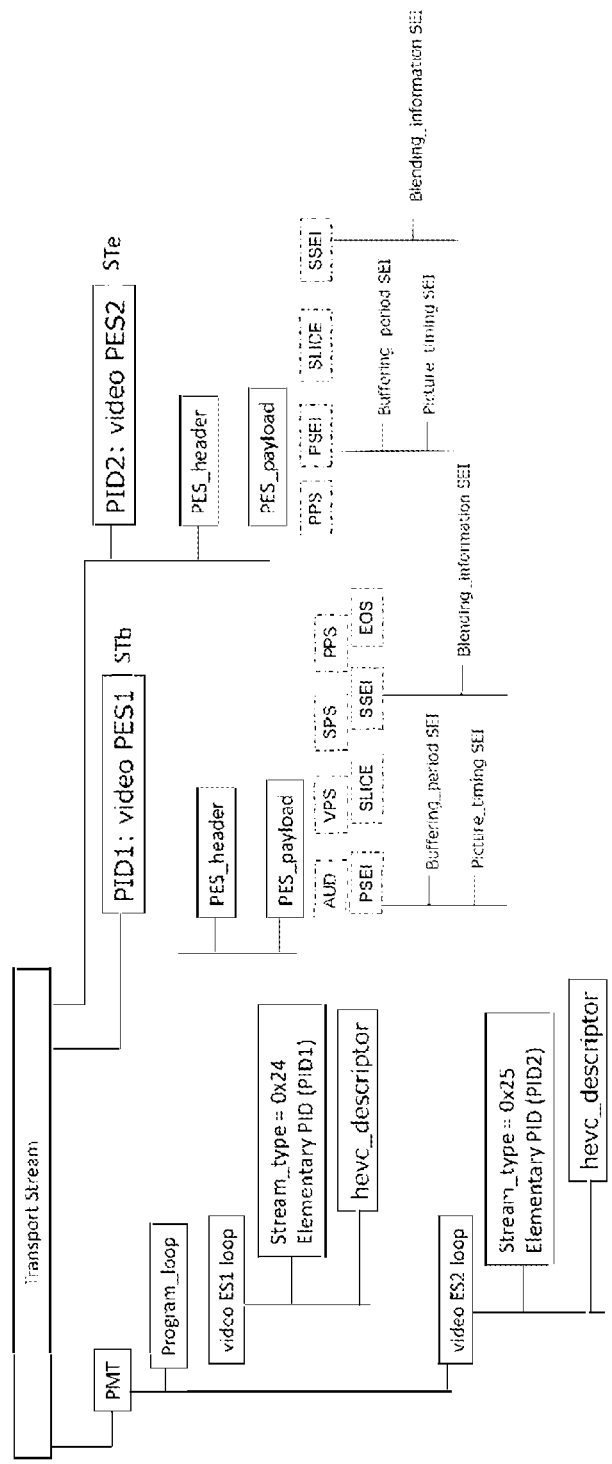
[FIG. 18]

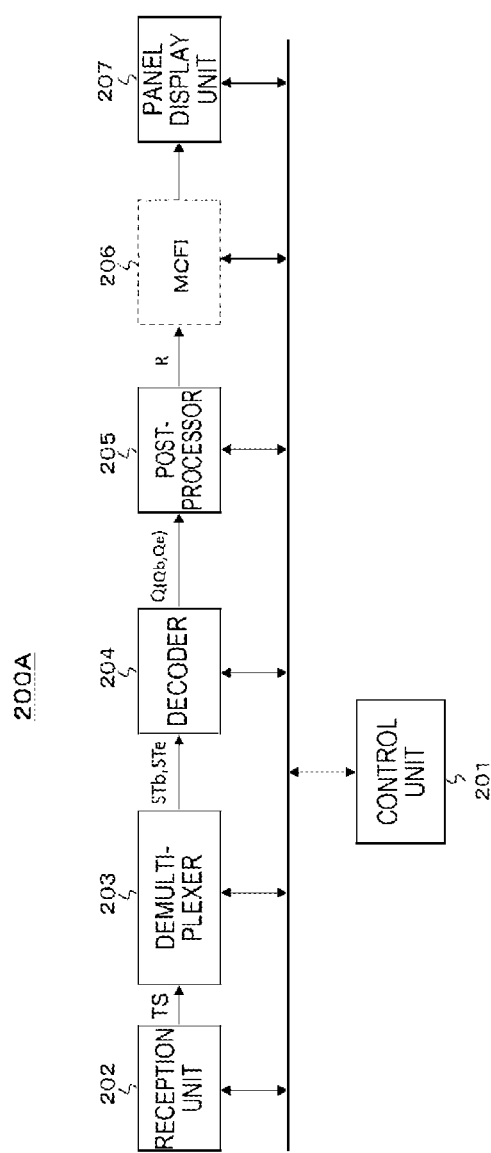

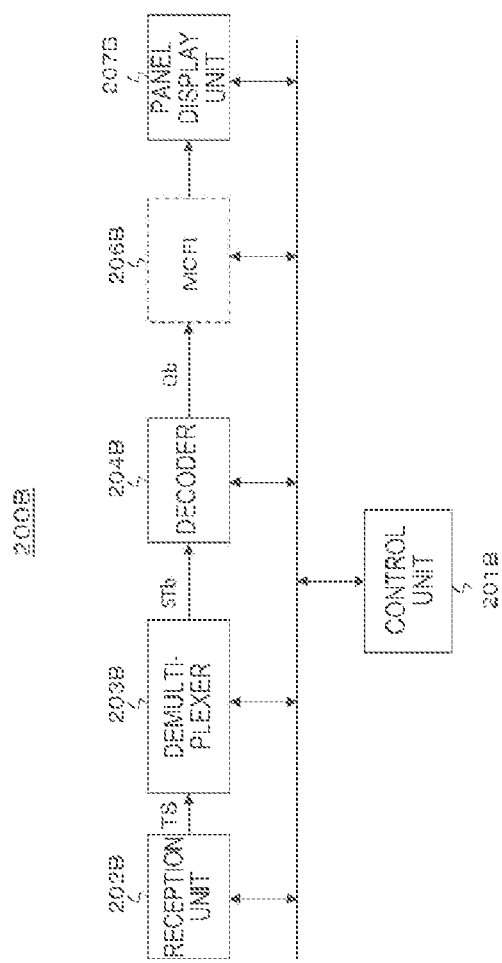

[FIG. 21]
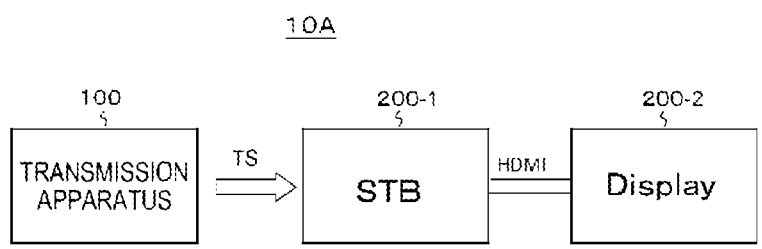

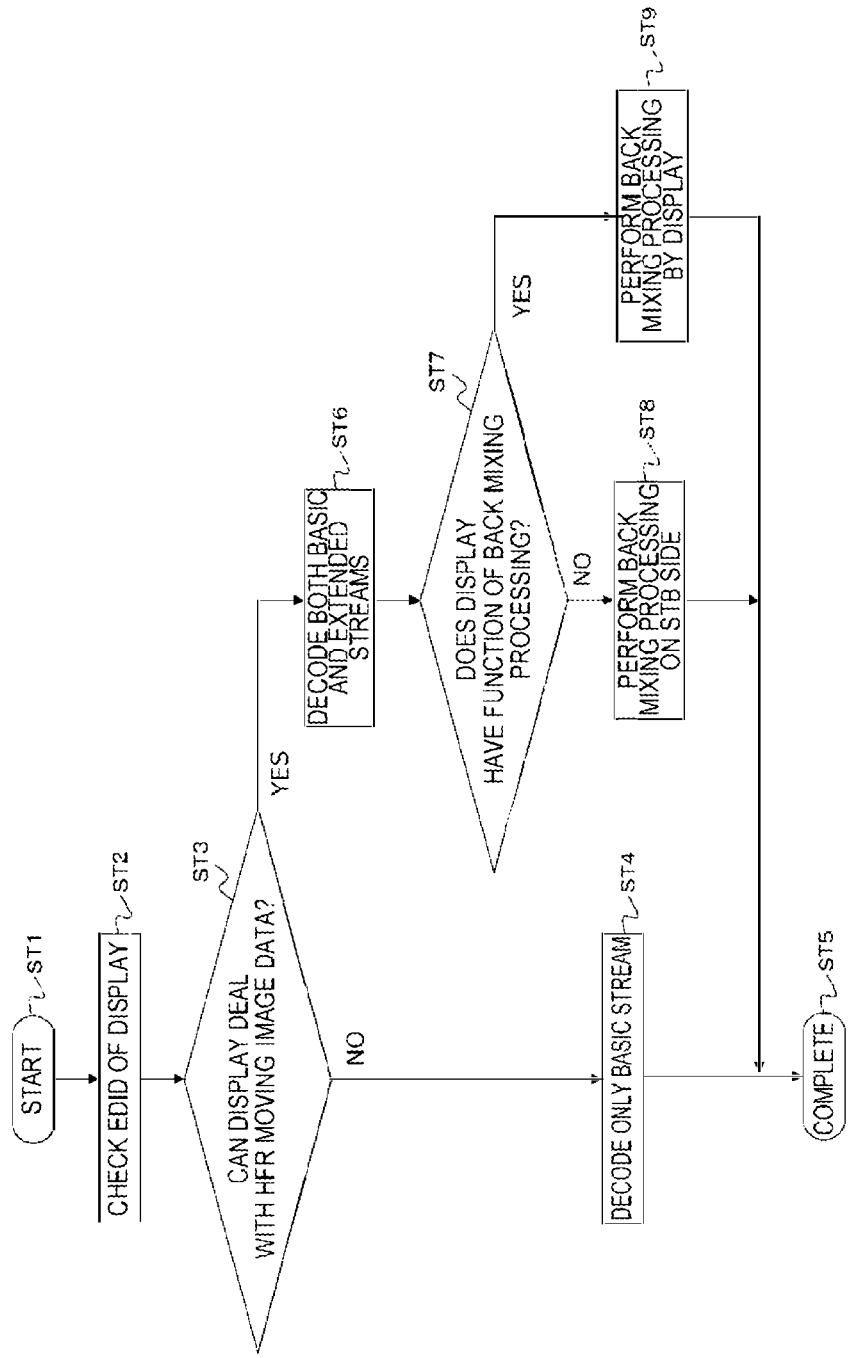

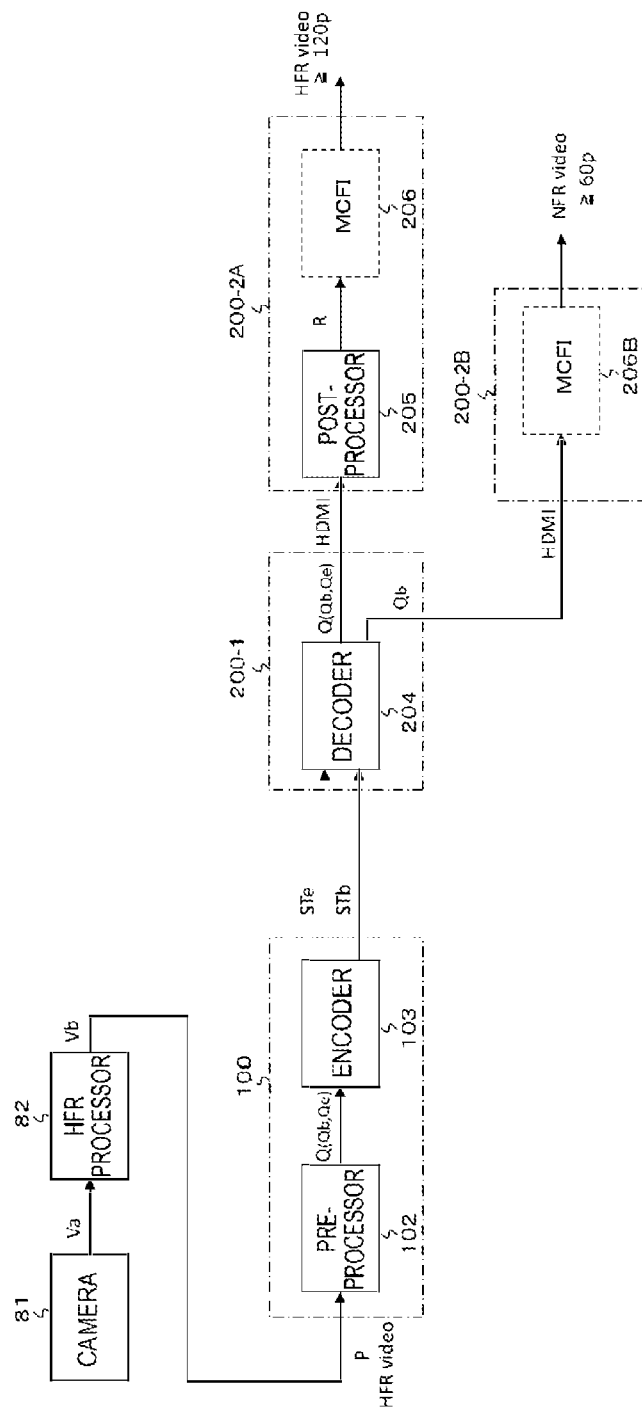

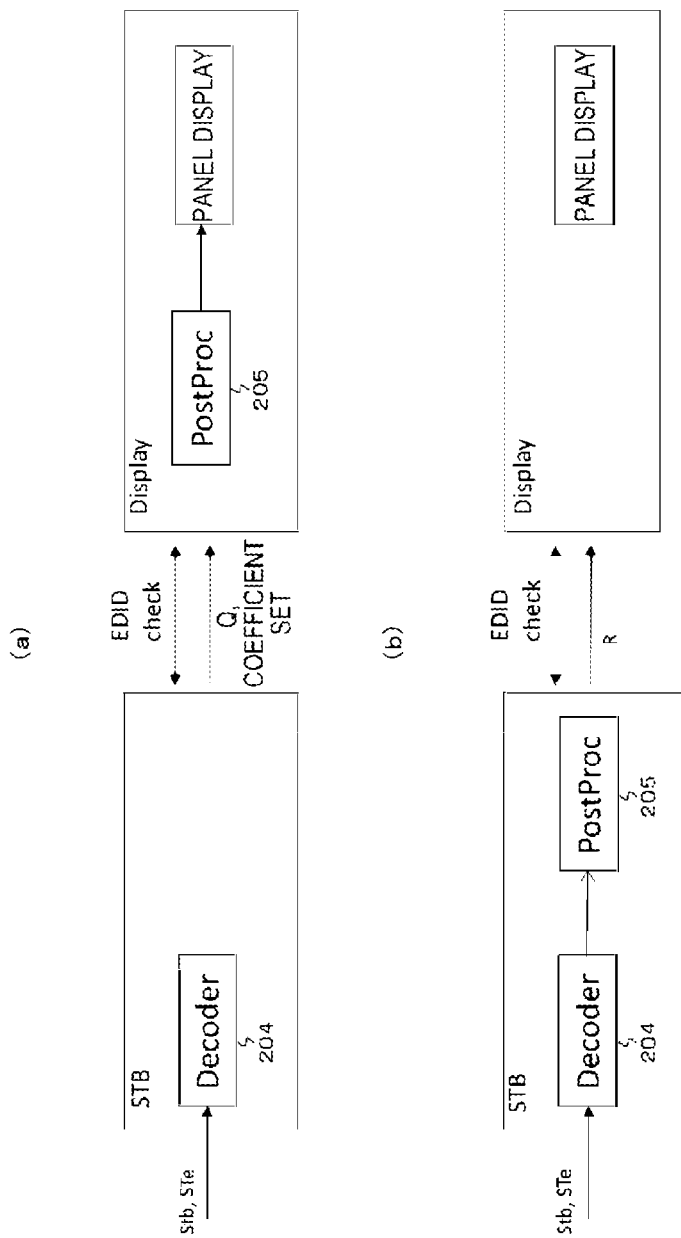

[FIG. 25]

Info Frame structure for HFR blending

| Byte \ Bit # | 7 | 6 | 5 | 4 | 3 | 2 | 1 | 0 |
|---|---|---|---|---|---|---|---|---|
| Info Frame Type Code | colspan="8" | New InfoFrame Type ||||||||
| Info Frame Version Number | colspan="8" | Version = 0x01 ||||||||
| Length of HFR InfoFrame | colspan="8" | Length ||||||||
| Data Byte 1 | colspan="4" | Frame Rate |||| colspan="3" | Temporal_filter_taps ||| Blending_flag |
| Data Byte 2 | colspan="6" | BR distance |||||| Refresh_flag | |
| Data Byte 3 | colspan="8" | Blend_coef_1 ||||||||
| Data Byte 4 | colspan="8" | Blend_coef_2 ||||||||
| Data Byte 5 | colspan="8" | Blend_coef_3 ||||||||
| Data Byte 6 | colspan="8" | Blend_coef_4 ||||||||
| Data Byte 7 | colspan="8" | Blend_coef_5 ||||||||

[FIG. 26]

```
frame Rate (3bits)
         0          50Hz
         1          60Hz
         2          100Hz
         3          120Hz
         4          200Hz
         5          240Hz
         others     reserved
blending_flag (1bit)
         0          blending is not applied
         1          blending is applied
temporal_filter_taps (2bits)
         0          2 frames
         1          3 frames
         2          4 frames
         3          5 frames
FF (1bit)    (first_frame_in_frame-pair_flag)
         0          represents that frame is other than 1st frame
         1          represents that frame is 1st frame
SF (1bit)    (synchronized_frame)
         0          it is not necessary to perform synchronization processing with next video frame
         1          it is necessary to perform synchronization processing with next video frame
BR distance (3bits)    represents temporal distance until blending refresh is performed
         0          1 frames
         1          2 frames
         2          3 frames
         3          4 frames
         4          5 frames
         others     reserved
refresh_flag (1bit)    represents that frame is target of blend refreshing
         0          blending is not refreshed
         1          blending is refreshed; that is, temporarily
                    previous frames of frame are not used
```

[FIG. 27]

```
Blend_coef_1 (8bits)    blending ratio for first picture frame
Blend_coef_2 (8bits)    blending ratio for second picture frame
Blend_coef_3 (8bits)    blending ratio for third picture frame
Blend_coef_4 (8bits)    blending ratio for fourth picture frame
Blend_coef_5 (8bits)    blending ratio for fifth picture frame
         0x0        0
         0x1        1/5
         0x2        1/4
         0x3        1/3
         0x4        1/2
         0x5        2/3
         0x6        3/4
         0x7        4/5
         0x8        1
         others     reserved
```

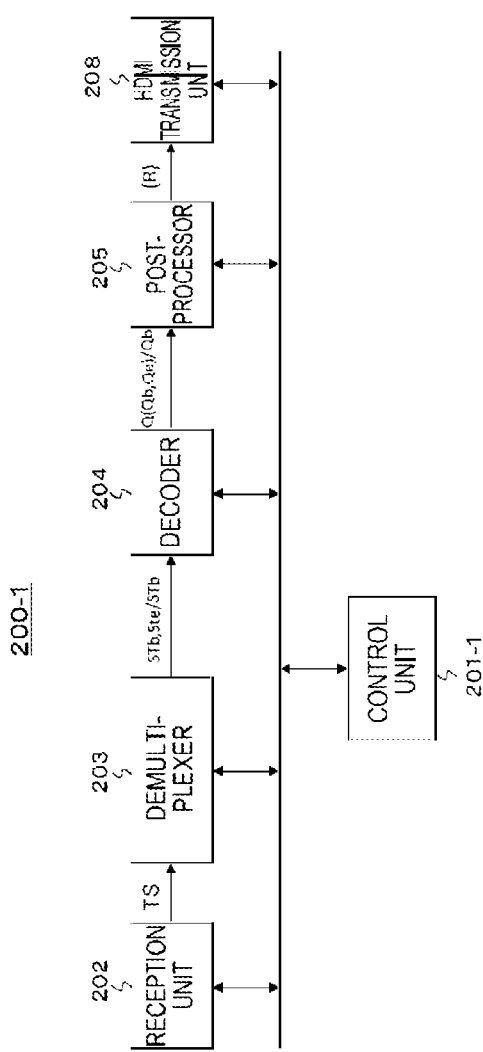
[FIG. 28]

[FIG. 29]
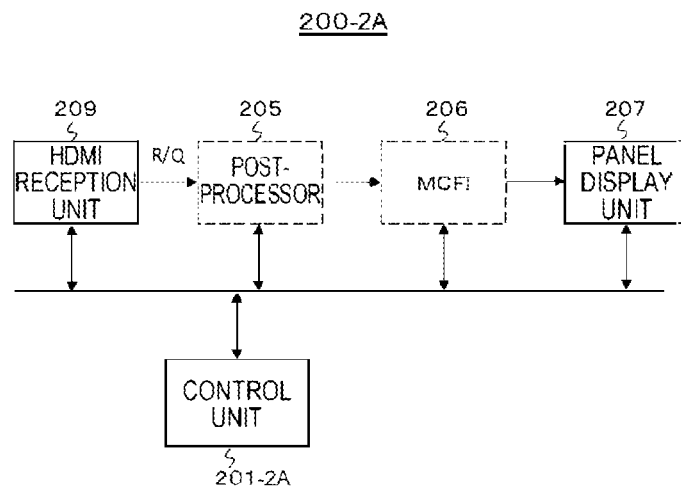
[FIG. 30]
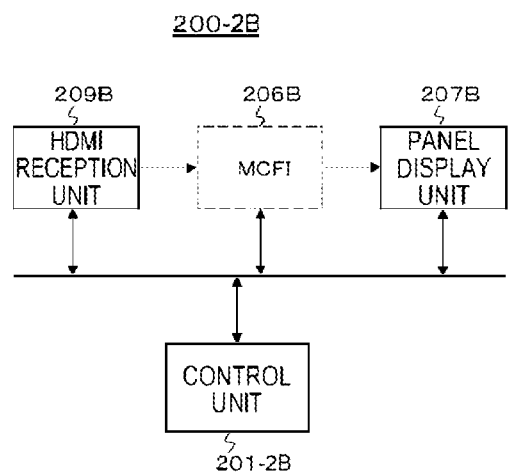

TRANSMISSION APPARATUS, TRANSMISSION METHOD, RECEPTION APPARATUS, AND RECEPTION METHOD

CROSS REFERENCE TO RELATED APPLICATIONS

This application claims the benefit of Japanese Priority Patent Application JP 2017-085730 filed Apr. 24, 2017, the entire contents of which are incorporated herein by reference.

TECHNICAL FIELD

The present technology relates to a transmission apparatus, a transmission method, a reception apparatus, and a reception method, and more particularly to a transmission apparatus that transits moving image data at a high frame rate and the like. Background Art In recent years, a camera that performs high frame rate imaging with a high-speed frame shutter is known. For example, a normal frame rate is 60 Hz, 50 Hz, or the like while the high frame rate is a frame rate that is several times, several tens of times, or further several hundreds of times as high as the normal frame rate.

In a case in which a high frame rate service is performed, it is considered that moving image data captured by a camera with a high-speed frame shutter is converted into and transmitted as a moving image sequence at a lower frequency than that of the moving image data. However, the image captured with the high-speed frame shutter has an effect that moving blur is improved and image quality with high sharpness is realized while the image has an element that leads to a problem in a traditional frame interpolation technology in terms of the image quality on a reception and reproduction side that displays the moving image sequence at a lower frame rate than the distributed high frame rate.

In the frame interpolation using an image with high sharpness captured with the high-speed frame shutter, there is a large difference between a case in which motion vector search is adapted and in a case in which the motion vector search is not adapted. Therefore, the difference between both the cases is displayed as significant degradation in the image quality. High load computation is necessary to improve accuracy of the motion vector search at the time of the frame interpolation, which affects receiver cost.

The applicant previously proposed a technology of converting an image material captured with a high-speed frame shutter and causing a traditional receiver that performs decoding at a normal frame rate to display the image with predetermined or higher image quality (see PTL 1).

CITATION LIST

Patent Literature

PTL 1: International Publication No. 2015/076277

SUMMARY OF INVENTION

Technical Problem

It is desirable to satisfactorily transfer moving image data at a normal frame rate and a high frame rate.

Solution to Problem

According to an embodiment of the present technology, there is provided a transmission apparatus that performs processing of mixing, at a mixing rate for each frame, a frame of first video data with one or more peripheral frames of the first video data and obtains second video data at a first frame rate. The second video data includes frames corresponding to a second frame rate that is lower than the first frame rate, where the frames corresponding to the second frame rate being mixed with the peripheral frames. The transmission apparatus encodes the frames corresponding to the second frame rate to obtain a basic stream and encodes remaining frames of the second video data to obtain an extended stream. The transmission apparatus then inserts information about the mixing rate of corresponding frames into the basic stream and the extended stream in association with the respective frames, and transmits the basic stream and the extended stream into which the information about the mixing rate has been inserted.

According to an embodiment of the present technology, the basic stream and the extended stream have a Network Abstraction Layer (NAL) unit structure, and the transmission apparatus inserts a Supplemental Enhancement Information (SEI) NAL unit with the information about the mixing rate into the basic stream and the extended stream. In an embodiment, the first frame rate is 120 Hz or 240 Hz, and the second frame rate is 60 Hz.

Information about the mixing rate, which is inserted into the basic stream and the extended stream, may include configuration information of a filter used to perform the mixing processing.

The information about the mixing rate may also include mixing refresh information indicating a number of frames until mixing refresh that does not use a temporally previous frame is performed.

The information about the mixing rate may also include refresh flag information indicating whether or not a respective frame is a target of the mixing refresh. The information about the mixing rate may also include head flag information indicating whether or not a respective frame corresponds to the second frame rate.

According to an embodiment of the present technology, at least the frame corresponding to the second frame rate (normal frame rate) in each frame that forms the second video data at the first frame rata (high frame rate) is mixed with the peripheral frames and is in a state in which an aperture ratio is raised, and the basic stream obtained by encoding the frame corresponding to the second frame rate (normal frame rate) is transmitted as described above.

Therefore, in a case of a receiver that has decoding ability with which the video data at the second frame rate (normal frame rate) can be processed, it is possible to display a smooth image as a moving image by processing the basic stream and obtaining the second frame rate and to avoid occurrence of a problem in image quality in a frame interpolation processing based on low load computation in display processing.

In addition, according to an embodiment of the present technology, the extended stream obtained by encoding the remaining frames is obtained along with the basic stream, and the information about the mixing rate of the corresponding frames is inserted into the basic stream and the extended stream in association with the respective frames, and the extended stream is then transmitted. Therefore, in a case of a receiver that has decoding ability with which the video data at the first frame rate (high frame rate) can be processed, it is possible to easily obtain the mixing-released video data at the first frame rate on the basis of the information about the mixing rate in each frame and to satisfactorily display the moving image at the first frame rate.

In addition, according to another embodiment of the present technology, there is provided a reception apparatus that receives a basic stream and an extended stream, which are obtained by performing processing of mixing, at a mixing rate for each frame, a frame of first video data with one or more peripheral frames of the first video data. The reception apparatus obtains second video data at a first frame rate, the second video data including frames corresponding to a second frame rate that is lower than the first frame rate.

The reception apparatus mixes the frames corresponding to the second frame rate with the peripheral frames and encodes the frames corresponding to the second frame rate to obtain the basic stream. The reception apparatus encodes remaining frames of the second video data to obtain the extended stream. Information about the mixing rate of corresponding frames is included in the basic stream and the extended stream in association with the respective frames.

The reception apparatus further decodes, based on a frame rate capability of a display connected to the reception apparatus, either the basic stream to obtain frames at the second frame rate or the basic stream and the extended stream to obtain the second video data, and, in the latter case, obtains mixing-released video data at the first frame rate by performing back mixing processing on the second video data on a basis of the information about the mixing rate.

According to an embodiment of the present technology, the video data at the second frame rate (normal frame rate) is obtained by processing only the basic stream in a case in which there is decoding ability with which the video data at the second frame rate (normal frame rate) as described above. Since the image data in each frame that forms the video data at the second frame rate (normal frame rate) is mixed with the peripheral frames, and a shutter aperture ratio is raised, it is possible to display a smooth image as a moving image and to avoid occurrence of a problem in image quality in the frame interpolation processing based on low load computation in the display processing.

In addition, according to an embodiment of the present technology, both the basic stream and the extended stream are processed to obtain the video data at the first frame rate (high frame rate) after the mixing processing, and further, the back mixing processing is performed on the basis of the information about the mixing rate in each frame to obtain the mixing-released video data at the first frame rate (normal frame rate) in a case in which there is decoding ability with which the video data at the first frame rate (high frame rate) can be processed. Therefore, it is possible to satisfactorily display the moving image at the first frame rate (high frame rate).

In addition, according to another embodiment of the present technology, there is provided a reception apparatus that acquires second video data obtained by performing processing of mixing, at a mixing rate for each frame, a frame of first video data with one or more peripheral frames of the first video data. The reception apparatus then transmits the second video data and information about the mixing rate in each frame to an external device via a transfer path.

According to an embodiment of the present technology, synchronization frame information indicating whether or not it is necessary to synchronize with a next video frame is included in the information about the mixing rate. The reception apparatus respectively inserts the information about the mixing rate in each frame into a blanking period of each frame of the second video data and transmits the second video data.

According to an embodiment of the present technology, the reception apparatus performs back mixing processing on each frame of the second video data on a basis of the information about the mixing rate to obtain third video data. The reception apparatus then transmits the third video data instead of the second video data when the external device does not have a function of the back mixing processing.

According to an embodiment, the second video data has a first frame rate, the second video data includes frames corresponding to a second frame rate that is lower than the first frame rate, and the frames corresponding to the second frame rate are mixed with the peripheral frames.

In addition, in an embodiment of the present technology, for example, the reception apparatus then transmits fourth video data that includes the frames corresponding to the second frame rate instead of the second video data when a frame rate at which display is able to be performed by the external device is the second frame rate.

In addition, according to another embodiment of the present technology, there is provided a reception apparatus that receives second video data obtained by performing processing of mixing, at a mixing rate for each frame, a frame of first video data with one or more peripheral frames of the first video data. The reception apparatus also receives information about a mixing rate in each frame from an external device via a transfer path. The reception apparatus then obtains mixing-released video data by performing back mixing processing on each frame of the second video data on a basis of the information about the mixing rate.

According to an embodiment of the present technology, the reception apparatus also receives information about a mixing rate in each frame from an external device via a transfer path. The reception apparatus then obtains mixing-released video data by performing back mixing processing on each frame of the second video data on a basis of the information about the mixing rate.

According to an embodiment of the present technology, the information about the mixing rate in each frame is received along with the second video data after the mixing processing from the external device, and the mixing-released video data is obtained by performing the back mixing processing on each frame of the second video data on the basis of the information about the mixing rate. Therefore, it is possible to appropriately obtain the video data with accuracy that is similar to that before the mixing processing and to satisfactorily display the moving image.

Advantageous Effects of Invention

According to an embodiment of the present technology, it is possible to satisfactorily transfer moving image data at the normal frame rate and the high frame rate. In addition, the advantages described herein are not necessarily limited, and any of the advantages described in the present disclosure may be achieved.

BRIEF DESCRIPTION OF DRAWINGS

FIG. 1 is a block diagram illustrating a configuration example of a transmission and reception system according to an embodiment.

FIG. 2 is a diagram illustrating an example of a basic stream at 60 Hz that is obtained by performing mixing processing on moving image data at 120 Hz, and an extended stream at +60 Hz.

FIG. 3 is a diagram illustrating an example of a basic stream at 60 Hz that is obtained by performing mixing processing on moving image data at 240 Hz, and an extended stream added thereto.

FIG. 4 is a diagram illustrating an outline of processing performed by a transmission apparatus and a television receiver.

FIG. 5 is a diagram schematically illustrating an example of mixing on a transmission side and back mixing on a reception side.

FIG. 7 is a block diagram illustrating a configuration example of the transmission apparatus.

FIG. 8 is a block diagram illustrating a configuration example of a pre-processor that performs the mixing processing on the transmission side.

FIG. 9 is a block diagram illustrating another configuration example of the preprocessor that performs the mixing processing on the transmission side.

FIG. 10 is a block diagram illustrating a configuration example of a post-processor that performs back mixing processing on the reception side.

FIG. 11 is a block diagram illustrating another configuration example of the post-processor that performs back mixing processing on the reception side.

FIG. 12 is a diagram illustrating a configuration example of {Blending information SEI message}.

FIG. 13 is a diagram illustrating a configuration example of {Blending_information( )}.

FIG. 14 is a diagram illustrating main content in the configuration example in {Blending_information ( )}.

FIG. 15 is a diagram illustrating an example of a change in the information {Blending_information( )} that is inserted into each frame (picture frame) in moving image data Q at a high frame rate on which mixing processing has been performed.

FIG. 16 is a diagram illustrating an example of a relation between the mixing processing by the pre-processor and the back mixing processing by the post-processor.

FIG. 17 is a diagram schematically illustrating an example of the mixing on the transmission side and the back mixing on the reception side.

FIG. 18 is a diagram illustrating a configuration example of a transport stream TS.

FIG. 19 is a block diagram illustrating a configuration example of a television receiver that has decoding ability with which moving image data at a high frame rate can be processed.

FIG. 20 is a block diagram illustrating a configuration example of a television receiver that has decoding ability with which moving image data at a normal frame rate can be processed.

FIG. 21 is a diagram illustrating another configuration example of the transmission and reception system.

FIG. 22 is a flowchart illustrating an example of a control processing procedure in a control unit (CPU) in a set top box.

FIG. 23 is a diagram illustrating an outline of processing performed by the transmission apparatus, the set top box, and a display.

FIG. 24 is a diagram illustrating a case in which the display has a function of the back mixing processing (mixing release processing) and a case in which the display does not have the function in a compared manner.

FIG. 25 is a diagram illustrating a configuration example of HFR blending infoframe.

FIG. 26 is a diagram illustrating content of main information in the configuration example of the HFR blending infoframe.

FIG. 27 is a diagram illustrating content of main information in the configuration example of the HFR blending infoframe.

FIG. 28 is a block diagram illustrating a configuration example of the set top box.

FIG. 29 is a block diagram illustrating a configuration example of the display that deals with moving image data at a high frame rate.

FIG. 30 is a block diagram illustrating a configuration example of the display that deals with moving image data at a normal frame rate.

DESCRIPTION OF EMBODIMENTS

Figure 6:
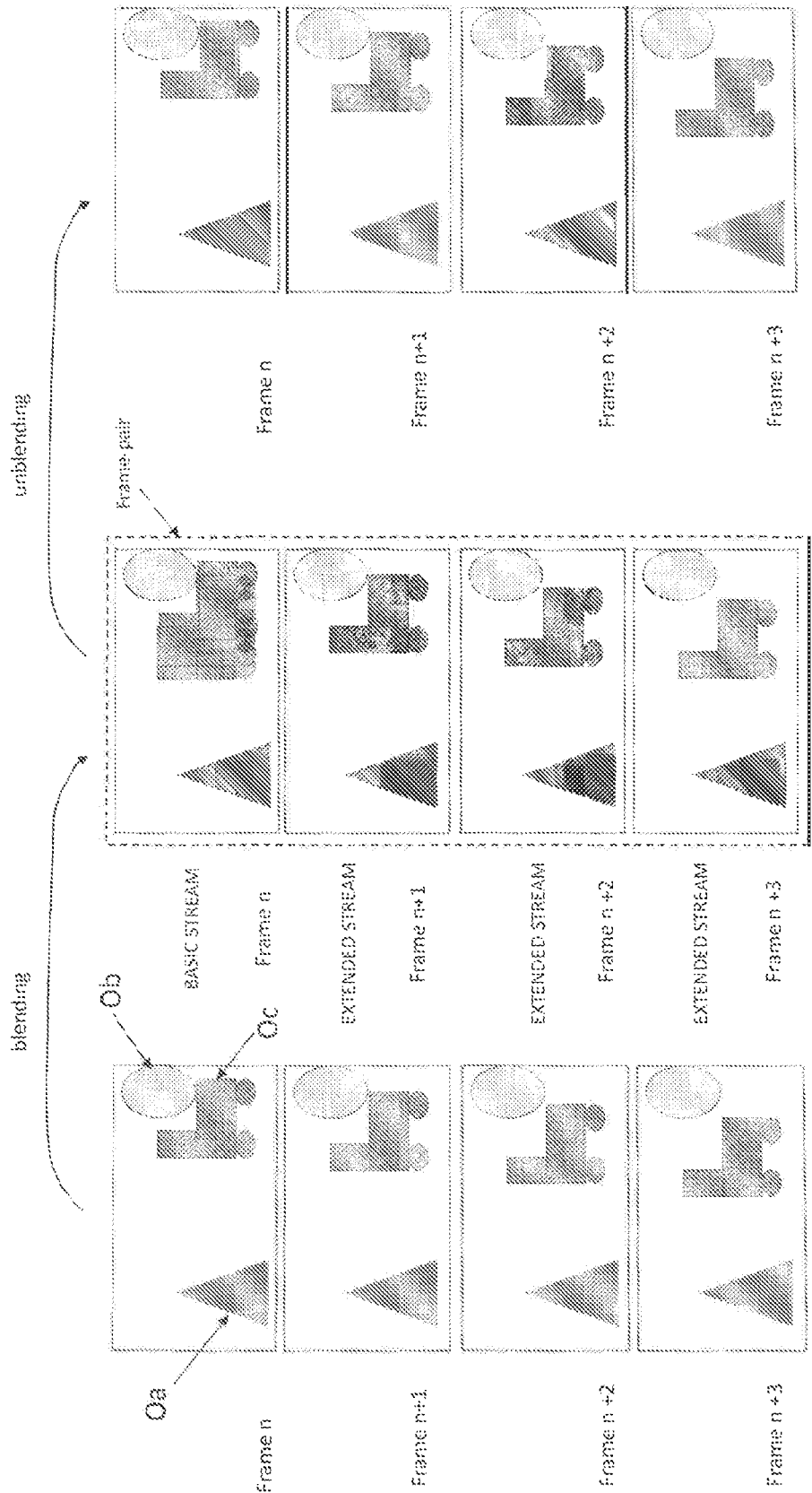
FIG. 6 is a diagram schematically illustrating another example of the mixing on the transmission side and the back mixing on the reception side.

Hereinafter, an embodiment for implementing the present disclosure (hereinafter, referred to as an "embodiment") will be described. In addition, the description will be given in the following order.
1. Embodiment
2. Modification Example

1. Embodiment

<<Transmission and Reception System>>

FIG. 1 illustrates a configuration example of a transmission and reception system 10 according to an embodiment. This transmission and reception system 10 has a transmission apparatus 100 and a television receiver 200.

The transmission apparatus 100 transmits a transport stream TS as a container on a broadcasting wave. This transport stream TS includes a basic stream (basic video stream) obtained by processing moving image data at a high frame rate, that is, at 120 Hz or 240 Hz in this embodiment and an extended stream (extended video stream). In this embodiment, the basic stream and the extended stream have a NAL unit structure.

Here, the basic stream is obtained as follows. That is, moving image data at a high frame rate after mixing processing is obtained by performing processing of mixing, at a mixing rate independent for each frame, image data in peripheral frames with image data in each frame of the moving image data at the high frame rate before the mixing.

At least image data in a frame corresponding to the normal frame rate, that is, 60 Hz in this embodiment in the image data in each frame that forms the moving image data at the high frame rate after the mixing processing is brought into a state in which the image data is mixed with the image data in the peripheral frames. The basic stream is obtained by encoding image data in a frame (basic frame) corresponding to the normal frame rate. In addition, the extended stream is obtained by encoding image data in the residual frames (extended frames).

The basic stream includes coded image data in each frame at the normal frame rate as an access unit. In addition, the extended stream includes a coded image data in each extended frame at the high frame rate as an access unit.

(a) and (b) in FIG. 2 illustrates an example of the basic stream at 60 Hz that is obtained by performing the mixing processing on moving image data at 120 Hz and an extended stream at +60 Hz. A frame pair is formed by one frame that forms the basic stream and one frame corresponding to the following extended frame.

In (a) in FIG. 2, image data in the frame of the basic stream, which is a first frame, is in a state (mixed state) in which the image data is mixed with image data in the peripheral frames while image data in the following frame of the extended stream is in a state (non-mixed state) in which the image data is not mixed with the image data in the peripheral frames, in each frame pair. In (b) in FIG. 2, image data in the frame of the basic stream, which is a first frame, is in the state (mixed state) in which the image data is mixed with the image data in the peripheral frames while image data in the following frame of the extended stream is also in the state (mixed state) in which the image data is mixed with the image data in the peripheral frames, in each frame pair.

(a), (b), (c), and (d) in FIG. 3 illustrate an example of basic streams at 60 Hz that are obtained by performing the mixing processing on moving image data at 240 Hz and an extended stream added thereto. A frame pair is formed by four frames including one frame that forms the basic stream and the following three frames corresponding to the extended frames.

In (a) in FIG. 3, image data in a frame of the basic stream, which is a first frame, is in the state (mixed state) in which the image data is mixed with image data in the peripheral frames while image data of all the three following frames of the extended stream is in a state (non-mixed state) in which the image data is not mixed with the image data in the peripheral frames, in each frame pair.

In (b) in FIG. 3, the image data in the frame of the basic stream, which is the first frame, is in the state (mixed state) in which the image data is mixed with the image data in the peripheral frames, in each frame pair. In addition, image data in a following first frame of the extended stream is in the state (non-mixed state) in which the image data is not mixed with the image data in the peripheral frame, image data in a second frame is in the state (mixed state) in which the image data is mixed with the image data in the peripheral frames, and image data in a third frame is in the state (non-mixed state) in which the image data is not mixed with the image data in the peripheral frames.

In (c) in FIG. 3, the image data in the frame of the basic stream, which is the first frame, is in the state (mixed state) in which the image data is mixed with the image data in the peripheral frames, in each frame pair. In addition, image data in a following first frame of the extended stream is in the state (mixed state) in which the image data is mixed with the image data in the peripheral frame, image data in a second frame is in the state (non-mixed state) in which the image data is not mixed with the image data in the peripheral frames, and image data in a third frame is in the state (mixed state) in which the image data is mixed with the image data in the peripheral frames.

In (d) in FIG. 3, image data in a frame of the basic stream, which is a first frame, is in the state (mixed state) in which the image data is mixed with image data in the peripheral frames while image data of all the three following frames of the extended stream is also in a state (mixed state) in which the image data is mixed with the image data in the peripheral frames, in each frame pair.

The information about the mixing rate in the corresponding frames is inserted into the basic stream and the extended stream in association with the image data in the respective frames. Here, the information about the mixing rate in each frame is respectively a set of coefficients corresponding to the number of taps of a filter used for the mixing processing. In a case in which m-tap filter capable of mixing m frames is used, for example, the coefficient set of each frame includes m coefficients. In this embodiment, a SEI NAL unit that has the information of the mixing rate (coefficient set) is inserted into the basic stream and the extended stream. The reception side can recognize at which rate the image data in each frame of the basic stream and the extended stream has mixed with peripheral image data, on the basis of the information about the mixing rate.

Returning to FIG. 1, the television receiver receives the aforementioned transport stream TS sent on the broadcasting wave from the transmission apparatus 100. In a case in which there is decoding ability with which the moving image data at the normal frame rate (60 Hz) can be processed, the reception apparatus 200 processes only the basic stream included in the transport stream TS, obtains the moving image data at the normal frame rate, and reproduces the image. In this case, the television receiver 200 performs decoding processing on the basic stream and obtains the image data in each frame at the normal frame rate.

Meanwhile, in a case in which there is decoding ability with which the moving image data at the high frame rate (120 Hz or 240 Hz) can be processed, the television receiver 200 processes both the basic stream and the extended stream included in the transport stream TS, obtains the moving image data at the high frame rate, and reproduces the image.

In this case, the television receiver 200 obtains the image data in each frame at the normal frame rate by performing the decoding processing on the basic stream, obtains the image data in each extended frame at the high frame rate by performing the decoding processing on the extended stream, and then performs the back mixing processing by using image data in each frame at the normal frame rate and the image data in each extended frame at the high frame rate on the basis of the information (coefficient set) about the mixing rate in each frame, thereby obtaining the moving image data at the high frame rate that is similar to that before the mixing processing.

FIG. 4 illustrates an outline of processing performed by the transmission apparatus 100 and the television receiver 200. In addition, although an image sequence Q output from a pre-processor 102 of the transmission apparatus 100 and an image sequence Q output from a decoder 204 of the television receiver 200A are the same in a time series manner, a case in which image quality in both the image sequences Q is different is also included since the image sequences Q are made to pass through a codec. Moving image data Va at a higher frame rate that is output from a camera (imaging apparatus) 81 is sent to an HFR processor 82, and moving image data Vb at the high frame rate (120 Hz or 240 Hz) is obtained. This moving image data Vb is input as moving image data P to the transmission apparatus 100.

In the transmission apparatus 100, the mixing processing is performed on the image data in each frame that forms the moving image data P by the pre-processor 102, and moving image data Q after the mixing processing that includes image data Qb in each frame at the normal frame rate and image data Qe in each extended frame at the high frame rate is obtained. In the transmission apparatus 100, an encoder 103 performs encoding processing on the image data Qb and Qe, and a basic stream STb and an extended stream STe are obtained. The transmission apparatus 100 transmits these streams STb and STe to the television receiver 200. In addition, the information about the mixing rate in the corresponding frames is inserted into these streams STb and STe in association with the image data in the respective frames.

In a television receiver 200A that has decoding ability with which the moving image data at the high frame rate can be processed, the decoder 204 performs decoding processing on the two streams STb and STe, and the moving image data Q, which includes the image data Qb in each frame at the normal frame rate and the image data Qe in each extended frame at the high frame rate, and on which the mixing processing has been performed, is obtained. Then, in the reception apparatus 200A, the post-processor 205 performs the back mixing processing (mixing release processing) on the image data in each frame of the moving image data Q on the basis of the information about the mixing rate in each frame, and moving image data R at the high frame rate (120 Hz or 240 Hz) that is similar to the moving image data P on the transmission side is obtained. The moving image data R is used as moving image data for display without any processing performed thereon or by performing frame interpolation by a motion compensated frame insertion (MCFI) unit 206 to increase the frame rate.

Meanwhile, in a television receiver 200B that has decoding ability with which the image data at the normal frame rate can be processed, a decoder 204B performs the decoding processing on the stream STb, and the image data Qb in each frame at the normal frame rate is obtained. Then, in the reception apparatus 200B, the moving image data including the image data Qb in each frame at the normal frame rate is used as moving image data for display without any processing performed or by performing frame interpolation by a motion compensated frame insertion (MCFI) unit 206B to increase the frame rate.

FIG. 5 schematically illustrating an example of mixing (blending) on the transmission side and back mixing (unblending) on the reception side. This example corresponds to the example in (a) in FIG. 2, a frame {n} and a frame {n+1} form a frame pair, and a frame {n+2} and a frame {n+3} form a frame pair. In addition, objects Oa and Ob are objects with no motion while an object Oc is an object with motion in the example illustrated in the drawing.

The image data in the frame of the basic stream, which is the first frame, is brought into a state (mixed state) in which the image data is mixed with image data in the peripheral frames, and image data in the following frame in the extended stream is brought into a state (non-mixed state) in which the image data is not mixed with the image data in the peripheral frames in each frame pair by the mixing processing on the transmission side. In addition, the mixed state is released by the back mixing processing on the reception side.

FIG. 6 schematically illustrates another example of the mixing (blending) on the transmission side and the back mixing (unblending) on the reception side. This example corresponds to the example in (a) in FIG. 3, and a frame {n} and frames {n+1} to {n+3} form frame pairs. In addition, objects Oa and Ob are objects with no motion while an object Oc is an object with motion in the example illustrated in the drawing.

The image data in the frame of the basic stream, which is the first frame, is brought into a state (mixed state) in which the image data is mixed with image data in the peripheral frames, and image data in the following three frames in the extended stream is brought into a state (non-mixed state) in which the image data is not mixed with the image data in the peripheral frames in each frame pair by the mixing processing on the transmission side. In addition, the mixed state is released by the back mixing processing on the reception side.

<<Configuration of Transmission Apparatus>>

FIG. 7 illustrates a configuration example of the transmission apparatus 100. This transmission apparatus 100 has a control unit 101, the pre-processor 102, the encoder 103, a multiplexer 104, and a transmission unit 105. The control unit 101 controls operations of the respective parts in the transmission apparatus 100.

The pre-processor 102 inputs the moving image data P at the high frame rate (120 Hz or 240 Hz) and outputs the image data Qb in each frame at the normal frame rate (60 Hz) and the image data Qe in each extended frame at the high frame rate.

Here, the pre-processor performs the processing of mixing, at the mixing rate independent for each frame, the image data in the peripheral frames with the image data in each frame of the moving image data P at the high frame rate before the mixing processing and obtains the moving image data Q at the high frame rate after the mixing processing. Image data in each frame corresponding to the normal frame rate (60 Hz) in the moving image data Q is the image data Qb, and image data in each residual frame is the image data Qe. In this case, at least the image data Qb is in a state in which the image data Qb is mixed with the image data in the peripheral frames.

The pre-processor 102 includes a filter in a time direction that has two or more taps, for example, and can perform the processing of mixing the image data in the peripheral frames at the mixing rate independent for each frame by changing the coefficient of each tap for each frame.

FIG. 8 illustrates a configuration example of the pre-processor 102. This preprocessor 102 includes a filter in the time direction that has three taps. This preprocessor 102 has delay elements 102a and 102b that has a delay time of one frame period, coefficient devices 102c, 102d, and 102e, and an adder 102f.

The moving image data P before the mixing processing is input to a serial circuit of the delay elements 102a and 102b. In this case, the moving image data P is sent in an order of the delay element 102b and the delay element 102a. Image data P1, P2, and P3 in three frames is obtained as three tap outputs on the output side of the delay element 102a, the input side of the delay element 102a (the output side of the delay element 102b), and the input side of the delay element 102b. The image data P1, P2, and P3 is multiplied by coefficients a, b, and c by the coefficient devices 102c, 102d, and 102e, respectively. The coefficient set (a, b, and c) are switched for each frame. The outputs of the respective coefficient devices 102c, 102d, and 102e are added by the adder 102f, and image data Q1, Q2, and Q3 in the respective frames of the moving image data Q after the mixing processing is sequentially obtained from the adder 102f.

FIG. 9 illustrates another configuration example of the pre-processor 102. This preprocessor 102 includes a filter in the time direction that has three taps. This preprocessor 102 is an example in which a coefficient set of a first system, a second system, and a third system is sequentially repeated for each frame.

This pre-processor 102 has delay elements 102a, 102b that have a delay time of one frame period, coefficient devices 102c1, 102d1, and 102e1 in the first system, coefficient devices 102c2, 102d2, and 102e2 in the second system, a coefficient devices 102c3, 102d3, and 102e3 in the second system, an adder 102f1 in the first system, an adder 102f2 in the second system, an adder 102f3 in the third system, and a frame output switching device (SW) 102g.

The moving image data P before the mixing processing is input to a serial circuit of the delay elements 102a and 102b. In this case, the moving image data P is sent in the order of the delay element 102b and the delay element 102a. Image data P1, P2, and P3 in three frames is obtained as three tap outputs on the output side of the delay element 102a, the input side of the delay element 102a (the output side of the delay element 102b), and the input side of the delay element 102b.

The output of the first system is obtained by multiplying the image data P1, P2, and P3 by coefficients a1, b1, and c1 by the coefficient devices 102c1, 102d1, and 102e1, respectively and then adding the results by the adder 102f1. In addition, the output of the second system is obtained by multiplying the image data P1, P2, and P3 by coefficients a2, b2, and c2 by the coefficient devices 102c2, 102d2, and 102e2, respectively and then adding the results by the adder 102f2. The output of the third system is obtained by multiplying the image data P1, P2, and P3 by coefficients a3, b3, and c3 by the coefficient devices 102c3, 102d3, and 102e3, respectively and then adding the results by the adder 102f3.

The outputs of the respective systems obtained by the adders 102f1, 102f2, and 102f3 are selectively extracted for each frame by the frame output switching device 102g, and the image data Q1, Q2, and Q3 in the respective frames of the moving image data Q after the mixing processing is sequentially obtained from the frame output switching device 102g.

Here, when the frame {n} is at the position of P2, the frame output switching device 102g selects a computation result of {P1*a1+P2*b1+P3*c1}. In addition, when the frame {n+1} is at the position of P2, the frame output switching device 102g selects a computation result of {P1*a2+P2*b2+P3*c2}. In addition, when the frame {n+2} is at the position of P2, the frame output switching device 102g selects a computation result of {P1*a3+P2*b3+P3*c3}.

The pre-processor 102 sequentially repeats the above processing. In addition, the pre-processor 102 includes a delay management function such that a synchronization relation between the coefficient set and the corresponding frames does not break.

FIG. 10 illustrates a configuration example of the post-processor 205 that performs the back mixing processing on the reception side. This example corresponds to the configuration example of the pre-processor 102 illustrated in FIG. 8. This post-processor 205 includes a filter with three taps. This post-processor 205 has delay elements 205a and 205b that has a delay time of one frame period, coefficient devices 205c, 205d, and 205e, and an adder 205f.

The moving image data Q before the back mixing processing is input to a serial circuit of the delay elements 205a and 205b. In this case, the moving image data Q is sent in the order of the delay element 205b and the delay element 205a. Image data Q1, Q2, and Q3 in the three frames is obtained as three tap outputs on the output side of the delay element 205a, the input side of the delay element 205a (the output side of the delay element 205b), and the input side of the delay element 205b.

The image data Q1, Q2, and Q3 are multiplied by coefficients a', b', and c' by the coefficient devices 205c, 205d, and 205e, respectively. The coefficient set (a', b', and c') is obtained to perform the back mixing processing (mixing release processing) from the coefficient set (a, b, and c) (see FIG. 8) at the time of the mixing processing that is provided from the transmission side and is switched for each frame. Outputs of the respective coefficient devices 205c, 205d, and 205e are added by the adder 205f, and image data R1, R2, and R3 in the respective frames of the moving image data R after the back mixing processing is sequentially obtained from the adder 205f.

FIG. 11 illustrates another configuration example of the post-processor 205 that performs the back mixing processing on the reception side. This example corresponds to the configuration example of the pre-processor 102 illustrated in FIG. 9. This post-processor 205 includes a filter that has three taps. This post-processor 205 is an example in which the coefficient set of the first system, the second system, and the third system is sequentially repeated for each frame.

This post-processor 205 has delay elements 205a, 205b that have a delay time of one frame period, coefficient devices 205c1, 205d1, and 205e1 in the first system, coefficient devices 205c2, 205d2, and 205e2 in the second system, a coefficient devices 205c3, 205d3, and 205e3 in the second system, an adder 205f1 in the first system, an adder 205f2 in the second system, an adder 205f3 in the third system, and a frame output switching device (SW) 205g.

The moving image data P before the back mixing processing is input to a serial circuit of the delay elements 205a and 205b. In this case, the moving image data Q is sent in the order of the delay element 205b and the delay element 205a. Image data Q1, Q2, and Q3 in the three frames is obtained as three tap outputs on the output side of the delay element 205a, the input side of the delay element 205a (the output side of the delay element 205b), and the input side of the delay element 205b.

In addition, the output of the first system is obtained by multiplying the image data Q1, Q2, and Q3 by coefficients a1, b1, and c1 by the coefficient devices 205c1, 205d1, and 205e1, respectively and then adding the results by the adder 205f1. In addition, the output of the second system is obtained by multiplying the image data Q1, Q2, and Q3 by coefficients a2, b2, and c2 by the coefficient devices 205c2, 205d2, and 205e2, respectively and then adding the results by the adder 205f2. The output of the third system is obtained by multiplying the image data Q1, Q2, and Q3 by coefficients a3, b3, and c3 by the coefficient devices 205c3, 205d3, and 205e3, respectively and then adding the results by the adder 205f3.

The coefficient sets (a1', b1', and c1'), (a2', b2', and c2'), and (a3', b3', c3') are obtained to perform the back mixing processing (mixing release processing) from the coefficient sets (a1, b1, and c1), (a2, b2, and c2), and (a3, b3, and c3) (see FIG. 9) at the time of the mixing processing that are provided from the transmission side.

The outputs of the respective systems obtained by the adders 205f1, 205f2, and 205f3 are selectively extracted for each frame by the frame output switching device 205g, and the image data R1, R2, and R3 in the respective frames of the moving image data R after the mixing processing is sequentially obtained from the frame output switching device 205g.

Here, when the frame {n} is at the position of Q2, the frame output switching device 205g selects a computation result of {Q1*a1'+Q2*b1'+Q3*c1'}. In addition, when the frame {n+1} is at the position of Q2, the frame output switching device 205g selects a computation result of {Q1*a2'+Q2*b2'+Q3*c2'}. In addition, when the frame {n+2} is at the position of Q2, the frame output switching device 205g selects a computation result of {Q1*a3'+Q2*b3'+Q3*c3'}.

The post-processor 205 sequentially repeats the above processing for each frame. In addition, the post-processor 205 includes the delay management function such that the synchronization relation between the coefficient sets and the corresponding frames does not break.

Returning to FIG. 7, the encoder 103 performs encoding processing on the image data Qb and Qe that is obtained by the pre-processor 102 and generates the basic stream STb and the extended stream STe. In this case, prediction encoding processing such as H.264/AVC or H.265/HEVC, for example is performed on the image data Qb and Qe.

The encoder 102 inserts the information about the mixing rate in the corresponding frames into the basic stream STb and the extended stream STe in association with the image data in the respective frames. The reception side can recognize at which rate the image data in each frame of the basic stream and the extended stream has been mixed with peripheral image data, on the basis of the information about the mixing rate and can appropriately perform the back mixing processing (mixing release processing).

In this embodiment, a SEI NAL unit that has information about the mixing rate is inserted into the respective access units of the basic stream STb and the extended stream STe. In this case, the encoder 103 inserts a blending information SEI message for new definition into a portion of "SEIs" in the access unit (AU).

(a) in FIG. 12 illustrates a structure example (Syntax) of {Blending_information SEI message}. {uuid_iso_iec_11578} has a UUID value indicated by "ISO/IEC 11578:1996 AnnexA". { } is inserted into the field of {user_data_payload_byte}. (b) in FIG. 12 illustrates a configuration example (Syntax) of {Blending_information_SEI( )}, and {Blending_information ( )} including the information about the mixing rate is inserted therein. {user-data_id} is an identifier indicated by 16 bits with no codes. 8-bit field of {Blending_information SEI_length} indicates a byte size of {Blending_information_SEI_length} at and after the field.

FIG. 13 illustrates a structure example (Syntax) of {Blending_information( )}, and FIG. 14 illustrates content (Semantics) of main information in the structure example. 3-bit field {frame_rate} represents a frame rate. For example, "3" represents 120 Hz, and "5" represents 240 Hz.

1-bit field of {blending_flag} represents whether or not the mixing processing with the peripheral image data is to be applied. For example, "0" represents that no application is to be made, and "1" represents that application is to be made. 2-bit field of {temporal_filter_taps} is configuration information of the filter used for performing the mixing processing and represents the number of frames used (the number of taps). For example, "0" represents two frames (two taps), and "1" represents three frames (three taps).

1-bit field of {first_frame_in_frame-pair_flag} indicates whether the frame is the first frame of the frame pair, that is, whether the frame is a frame corresponding to the temporal display position at the normal frame rate. For example, "0" represents that the frame is a frame other than the first frame, and "1" represents that the frame is the first frame. In addition, the frame pair includes the one frame that forms the basic stream and the following predetermined number of extended frames as described above (see FIGS. 2 and 3).

3-bit field of {blending_refresh_distance (BR distance)} represents the number of frames (temporal distance) until temporal linkage of the mixing processing is refreshed without using the image data in the temporarily previous frame. For example, "0" represents one frame, "1" represents two frames, and "2" represents three frames. 1-bit field of {refresh_flag} indicates whether or not the frame refreshes the aforementioned temporal linkage of the mixing processing. For example, "0" represents that the mixing refresh is not performed for the frame, and "1" represents that the mixing refresh is performed for the frame.

8-bit field of {blend_coefficient} is repeatedly present to correspond to the number of frames (the number of taps) represented by the aforementioned field of {temporal_filter_taps}. This field represents a coefficient (blend ratio) by which the image data in each frame is multiplied. For example, "0x0" represents {0}, "0x1" represents {1/5}, "0x2" represents {1/4}, "0x3" represents {1/3}, "0x4" represents {1/2}, "0x5" represents {2/3}, "0x6" represents {3/4}, "0x7" represents {4/5}, and "0x8" represents {1}.

FIG. 15 illustrates an example of a change in the information of {Blending_information( )} to be inserted into each frame (picture frame) in the moving image data Q at the high frame rate, on which the mixing processing has been performed. The example illustrated in the drawing illustrates a case in which {temporal_filter_taps} is "1" and the number of frames (the number of taps) is {3}.

For example, the frame {n} included in the basic stream represents that {refresh_flag} is "1" and the mixing refresh is to be performed for the frame, and also {bleding_refresh_distance (BR distance)} is "3" and the number of frames until the frame for which the next mixing refresh is to be performed is four frames. In addition, the fact that the frame of the center coefficient in the three frames (three taps) is a current frame, and the frames are {(=1), 6 (=3/4), 2 (=1/4)} from the old one is represented.

In addition, the frame {n+1} included in the extended frame represents that {refresh_flag} is "0" and the mixing refresh is not to be performed for the frame, and also {blending_refresh_distance (BR distance)} is "2" and the number of frames until the frame for which the next mixing fresh is performed is three frames. In addition, the fact that the frame of the center coefficient in the three frames (three taps) is a current frame, and the frames are {(=0), 8 (=1), and 0 (=0)} from the old one is represented.

In addition, the frame {n+2} included in the basic frame, for example, represents that {refresh_flag} is "0" and the mixing fresh is not to be performed for the frame, and also {blending_refresh_distance (BR distance)} is "1" and the number of frames until the frame for which the next mixing refresh is performed is two frames. In addition, the fact that the frame of the center coefficient in the three frames (three taps) is the current frame, and the frames are {2 (=1/4), 4 (=1/2), and 2 (=1/4)} from the old one is represented.

In addition, the frame {n+3} included in the extended frame represents that {refresh_flag} is "0" and the mixing refresh is not to be performed for the frame, and also {blending_refresh_distance (BR distance)} is "0" and the number of frames until the frame for which the next mixing fresh is performed is one frame. In addition, the fact that the frame of the center coefficient in the three frames (three taps) is a current frame, and the frames are {(=0), 8 (=1), and 0 (=0)} from the old one is represented.

For example, the frame {n+4} included in the basic stream represents that {refresh_flag} is "1" and the mixing refresh is to be performed for the frame, and also {bleding_refresh_distance (BR distance)} is "3" and the number of frames until the frame for which the next mixing refresh is to be performed is four frames. In addition, the fact that the frame of the center coefficient in the three frames (three taps) is a current frame, and the frames are {0 (=1), 6 (=3/4), 2 (=1/4)} from the old one is represented.

FIG. 16 corresponds to the example in FIG. 15 and illustrates an example of a relation between the mixing processing performed by the pre-processor 102 and the back mixing processing performed by the post-processor 205. The coefficient (mixing ratio) used in the back mixing processing performed by the post-processor 205 is obtained on the basis of a coefficient (mixing ratio) used in the latest processing.

In addition, the aforementioned case of the example illustrated in FIG. 5 can be realized by setting {temporal_filter_taps} to "1 (three frames)", setting the coefficients of the three frames (three taps) in the frame {n} to {(=0), 4

(=1/2), and 4=(=1/2)}, setting coefficients of the three frames (three taps) in the frame {n+1} to {(=0), 8 (=1), and 0 (=0)}, setting the coefficients of the three frames (three taps) in the frame {n+2} to {0 (=0), 4 (=1/2), 4 (=1/2)}, setting the coefficients of the three frames (three taps) in the frame {n+3} to {0 (=0), 8 (=1), and 0 (=0)}, and repeating this thereafter.

In addition, in a case in which mixing with the next frame is performed in a progressive manner, that is, in a case in which coefficient linkage between the frames in the mixing processing continues over two or more frames, setting is made such that only the frame with {refresh_flag} of "1" has {first_frame_in_frame-pair_flag} of "1". The post-processor 205 performs the back mixing processing from the frame with {refresh_flag} of "1". The back mixing processing is performed from the previous frame of the frame with {refresh_flag} of "1", that is, in the order of the frame {n+2}, the frame {n+1}, and the frame {n} while tracking back from the frame {n+3} in FIG. 16. At this time, the target maximum number of frames is represented by {blending refresh distance (BR distance)}, and the value of the frame number {n} is four frames in the example in FIG. 16. FIG. 17 schematically illustrates an example of the mixing (blending) on the transmission side and the back mixing (unblending) on the reception side.

Returning to FIG. 7, the multiplexer 104 packetized-elementary-stream (PES) packetizes the basic stream STb and the extended stream STe that are generated by the encode 103 and further transport-packetizes and multiplexes the streams, thereby obtaining the transport stream TS as a multiplexed stream.

FIG. 18 illustrates a configuration example of the transport stream TS. This transport stream TS includes two video streams, namely the basic stream (base stream) STb and the extended stream (enhanced stream) STe. That is, a PES packet {video PES1} of the basic stream STb is present, and also a PES packet {video PES2} of the extended stream STe is present in this configuration example.

The blending information SEI message (see FIG. 13) is inserted into encoded image data of each picture that forms a container of the PES packet {video PES1} and the PES packet {video PES2}.

In addition, the transport stream TS includes a program map table (PMT) as one piece of program specific information (PSI). The PSI is information describing which programs the respective elementary streams included in the transport stream belong to.

A program loop (Programloop) that describes information related to the entire programs is present in the PMT. In addition, an elementary stream loop that has information related to the respective video streams is present in the PMT. In this configuration example, a video elementary stream loop {video ES1 loop} corresponding to the basic stream is present, and a video elementary stream loop {video ES2 loop} corresponding to the extended stream is present.

Information such as a stream type and a packet identifier (PID) is arranged to correspond to the basic stream (video PES1), and also a descriptor that describes the information related to the video stream is also arranged in {video ES1 loop}. This stream type is "0x24" indicating the basic stream in a case of HEVC coding.

In addition, information such as a stream type and a packet identifier (PID) is arranged to correspond to the extended stream (video PES2), and also, a descriptor that describes the information related to the video stream is also arranged in {video ES2 loop}. This stream type is "0x25" indicating the extended stream.

In addition, although the example illustrated in the drawing illustrates a case in which HEVC coding is performed, transmission of signaling information by the blending information SEI message can similarly be applied to another codec. In a case of another codec, a different description is inserted into the PMT.

Returning to FIG. 7, the transmission unit 105 modulates the transport stream TS by a modulation scheme that is suitable for broadcasting, such as QPSK/OFDM, and transmits an RF modulation signal to a transmission antenna.

Operations of the transmission apparatus 100 illustrated in FIG. 7 will be briefly described. Moving image data P at the high frame rate (120 Hz or 240 Hz) is input to the pre-processor 102. In this pre-processor 102, the mixing processing is performed on the moving image data P, and the image data Qb in each frame at the normal frame rate (60 Hz) and the image data Qe in each extended frame at the high frame rate are obtained.

In this case, the processing of mixing, at the mixing rate independent for each frame, the image data in the peripheral frames with the image data in each frame of the moving image data P at the high frame rate before the mixing processing is performed, and the moving image data Q at the high frame rate after the mixing processing is obtained in the pre-processor 102. In this moving image data Q, image data in each frame corresponding to the normal frame rate (60 Hz) is regarded as the image data Qb, and image data in the residual respective frames is regarded as the image data Qe. In this case, at least the image data Qb is brought into a state in which the image data Qb is mixed with the image data in the peripheral frames.

The image data Qb and Qe obtained by the pre-processor 102 is supplied to the encoder 103. In the encoder 103, encoding processing is performed on the image data Qb and Qe, and the basic stream STb and the extended stream STe are generated. In this encoder 103, the information about the mixing ratio in the mixing processing is inserted onto the basic stream STb and the extended stream STe.

The encoder 103 inserts the information about the mixing rate in the corresponding frames into the basic stream STb and the extended stream STe in association with the image data in the respective frames. The reception side can recognize at which rate the image data in each frame of the basic stream and the extended stream has been mixed with peripheral image data, on the basis of the information about the mixing rate and can appropriately perform the back mixing processing (mixing release processing).

The basic stream STb and the extended stream STe generated by the encoder 103 is supplied to the multiplexer 104. The multiplexer 104 PES packetizes the basic stream STb and the extended stream STe and further transport-packetizes and multiplexes the streams, thereby obtaining the transport stream TS as a multiplexed stream.

The transport stream TS generated by the multiplexer 104 is sent to the transmission unit 105. The transmission unit 105 modulates this transport stream TS by a modulation scheme that is suitable for broadcasting, such as QPSK/OFDM, for example, and transmits an RF modulation signal from the transmission antenna.

<<Configuration of Television Receiver>>

FIG. 19 illustrates a configuration example of the television receiver 200A that has decoding ability with which moving image data at the high frame rate (120 Hz or 240 Hz) can be processed. This television receiver 200A has a control unit 201, a reception unit 202, a demultiplexer 203, a decoder 204, the post-processor 205, a motion compensated frame insertion (MCFI) unit 206, and a panel display unit 207.

The control unit 201 controls operations of the respective parts in the television receiver 200A. The reception unit 202 demodulates the RF modulation signal received by a reception antenna and acquires the transport stream TS. The demultiplexer 203 extracts the basic stream STb and the extended stream STe by PID filtering from the transport stream TS and supplies the basic stream STb and the extended stream STe to the decoder 204.

The decoder 204 performs decoding processing on the basic stream STb to obtain the image data Qb in each frame at the normal frame rate and performs decoding processing on the extended stream STe to obtain the image data Qe in each extended frame at the high frame rate. In this manner, the moving image data Q at the high frame rate, on which the mixing processing of the image data Qb and the image data Qe has been performed, is obtained.

In addition, the decoder 204 extracts a parameter set and SEI that have been inserted into the respective access units that form the basic stream STb and the extended stream STe and sends the parameter set and the SEI to the control unit 201. In this case, the blending information SEI (see FIG. 13) that has information about the mixing rate is extracted. In this manner, the control unit 201 can recognize at which rate the image data in each frame of the moving image data Q at the high frame rate after the mixing processing has been mixed with the peripheral image data, obtain coefficients for the back mixing processing, and satisfactorily control the post-processor 205, which will be described later.

The post-processor 205 performs the back mixing processing (mixing release processing) on the moving image data Q at the high frame rate, which has been obtained by the decoder 204, under the control by the control unit 201 and obtains mixing-released moving image data R at the high frame rate. The post-processor 205 includes a filter that has two or more taps, for example, and can release the mixing by changing the coefficient of each tap for each frame and mixing the image data in the peripheral frames at the mixing rate independent for each frame (see FIGS. 10, 11, and 16). In this case, the control unit 201 calculates the coefficient set for each frame on the basis of the coefficient set at the time of the mixing processing, which has been inserted into each frame of the moving image data Q, and uses the coefficient set as described above.

The MCFI unit 206 performs frame interpolation processing of motion compensation on the moving image data R at the high frame rate, which has been obtained by the post-processor 205, and obtains the moving image data at a further increased frame rate. In addition, there is also a case in which this MCFI unit 206 is not provided. The panel display unit 207 performs image display based on the moving image data R at the high frame rate that has been obtained by the post-processor 205 or the moving image data at a frame rate increased by the MCFI unit 206.

Operations of the television receiver 200A illustrated in FIG. 19 will be briefly described. The reception unit 202 demodulates the RF modulation signal received by the reception antenna and acquires the transport stream TS. This transport stream TS is sent to the demultiplexer 203. The demultiplexer 203 extracts the basic stream STb and the extended stream STe from the transport stream TS by the PID filtering and supplies the basic stream STb and the extended stream STe to the decoder 204.

The decoder 204 performs the decoding processing on the basic stream STb and the extended stream STe and obtains the moving image data Q at the high frame rate after the mixing processing that includes the image data Qb in each frame at the normal frame rate and the image data Qe in each extended frame at the high frame rate. The moving image data Q is supplied to the post-processor 205.

In addition, the decoder 204 extracts a parameter set and SEI inserted into each access unit that forms the basic stream STb and the extended stream STe and sends the parameter set and the SEI to the control unit 201. In this case, the blending information SEI (see FIG. 13) that has information about the mixing rate is also extracted. The control unit 201 computes the coefficients for the back mixing processing on the basis of the information about the mixing rate (coefficient set) in each frame.

The post-processor 205 performs the back mixing processing (mixing release processing) on the moving image data Q at the high frame rate under control by the control unit 201 and obtains the mixing-released moving image data R at the high frame rate. In this case, the coefficients for the back mixing processing are provided from the control unit 201 to the post-processor 205.

The mixing-released moving image data R at the high frame rate that has been obtained by the host processor 205 or the moving image data at the frame rate further increased by the MCFI unit 206 is supplied to the panel display unit 207, and the panel display unit 207 performs image display based on the moving image data.

FIG. 20 illustrates a configuration example of a television receiver 208B that has decoding ability with which the moving image data at the normal frame rate (60 Hz) can be processed. This television receiver 200B has a control unit 201B, a reception unit 202B, a demultiplexer 203B, a decoder 204B, an MCFI unit 206B, and a panel display unit 207B.

The control unit 201B controls operations of the respective parts in the television receiver 200B. The receiver unit 202B demodulates the RF modulation signal received by the reception antenna and acquires the transport stream TS. The demultiplexer 203B extracts the basic stream STb from the transport stream Ts by the PID filtering and supplies the basic stream STb to the decoder 204B. The decoder 204B performs the decoding processing on the basic stream STb and obtains the moving image data at the normal frame rate that includes the image data Qb in each frame at the normal frame rate.

The MCFI unit 206B performs frame interpolation processing of motion compensation on the moving image data at this normal frame rate and obtains the moving image data at a further increased frame rate. In addition, there is also a case in which this MCFI unit 206 is not provided. The panel display unit 207B performs image display based on the moving image data R at the normal frame rate that has been obtained by the post-processor 205 or the moving image data at a frame rate increased by the MCFI unit 206.

Operations of the television receiver 200B illustrated in FIG. 20 will be briefly described. The reception unit 202B demodulates the RF modulation signal received by the reception antenna and acquires the transport stream TS. This transport stream TS is sent to the demultiplexer 203B. The demultiplexer 203B extracts the basic stream STb from the transport stream TS by the PID filtering and supplies the basic stream STb to the decoder 204.

The decoder 204B performs the decoding processing on the basic stream STb and obtains the moving image data at the normal frame rate that includes the image data Qb in each frame at the normal frame rate. The moving image data at the normal frame rate obtained by the decoder 204B or the moving image data at the frame rate further increased by the MCFI unit 206B is supplied to the panel display unit t207B, and the panel display unit 207B performs image display based on the moving image data.

As described above, at least the image data in the frame corresponding to the normal frame rate in the image data in each frame that forms the moving image data at the high frame rate is mixed with the image data in the peripheral frames and is brought into a state in which the shutter aperture ratio is increased, and basic stream STb obtained by encoding the image data in the frame corresponding to the normal frame rate is transmitted in the transmission and reception system 10 illustrated in FIG. 1.

Therefore, in a case of the television receiver 200B that has decoding ability with which the moving image data at the normal frame rate can be processed, it is possible to display a smooth image as a moving image by processing the basic stream and obtaining the moving image data at the normal frame rate and to avoid occurrence of the problem in image quality in the frame interpolation processing due to low load computation in the display processing.

In addition, the extended stream STe obtained by encoding the image data in the residual frames is obtained along with the basic stream STb, in the transmission and reception system 10 illustrated in FIG. 1, and the information (coefficient set) about the mixing rate in the corresponding frames is inserted into the basic stream STb and the extended stream STe in association with the image data in the respective frames and is then transmitted. Therefore, in a case of a receiver that has decoding ability with which the moving image data at the high frame rate can be processed, it is possible to easily obtain the mixing-released moving image data at the high frame rate on the basis of the information about the mixing rate in each frame and to satisfactorily display the moving image at the high frame rate.

2. Modification Example

In addition, although the example of the transmission and reception system 10 that includes the transmission apparatus 100 and the television receiver 200 has been described in the aforementioned embodiment, the configuration of the transmission and reception system to which the present technology can be applied is not limited thereto. A case is also considered in which a portion of the television receiver 200 includes a set top box and a display that are connected by a digital interface such as a high-definition multimedia interface (HDMI), for example. Note that {HDMI} is a registered trademark.

FIG. 21 illustrates a configuration example of a transmission and reception system 10A. This transmission and reception system 10A has a configuration having the transmission apparatus 100, a set top box (STB) 200-1, and a display 200-2. The set top box (STB) 200-1 and the display 200-2 are connected by the HDMI.

Since the transmission apparatus 100 is the same as the transmission apparatus 100 in the transmission and reception system 10 illustrated in FIG. 1, the description thereof will be omitted. A set top box 200-1 receives the transport stream TS sent on the broadcasting wave from the transmission apparatus 100.

In a case in which the display 200-2 can deal with the moving image data at the high frame rate (120 Hz or 240 Hz), the set top box 200-1 processes both the basic stream STb and the extended stream STe included in the transport stream TS and obtains the moving image data Q at the high frame rate, on which the mixing processing has been performed.

In a case in which the display 200-2 has the function of the back mixing processing (mixing release processing), the set top box 200-1 sends the moving image data Q at the high frame rate, on which the mixing processing has been performed, and the information (coefficient set) about the mixing rate in each frame to the display 200-2 via the HDMI transfer path.

In addition, in a case in which the display 200-2 does not have the function of the back mixing processing (mixing release processing), the set top box 200-1 performs the back mixing processing (mixing release processing) on the moving image data Q at the high frame rate, on which the mixing processing has been performed, on the basis of the information (coefficient set) about the mixing rate in each frame and obtains the mixing-released moving image data R at the high frame rate. Then, the set top box 200-1 sends the moving image data R at the high frame rate to the display 200-2 via the HDMI transfer path.

Meanwhile, in a case in which the display 200-2 can deal with the moving image data at the normal frame rate (60 Hz), the set top box 200-1 processes only the basic stream STb included in the transport stream TS and obtains the moving image data at the normal frame rate that includes the image data Qb in each frame at the normal frame rate. Then, the set top box 200-1 sends the moving image data at the normal frame rate to the display 200-2 via the HDMI transfer path.

The set top box 200-1 that serves as a source device acquires EDID from the display 200-2 that serves as a sink device, determines whether or not the display 200-2 can deal with the moving image data at the high frame rate (120 Hz or 240 Hz), and further determines whether or not the display 200-2 has the function of the back mixing processing (mixing release processing).

The flowchart in FIG. 22 illustrates an example of a control processing procedure in a control unit (CPU) of the set top box 200-1. First, the control unit starts control processing in Step ST1. Next, the control unit reads and checks EDID from the display 200-2 in Step ST2. Then, the control unit determines whether or not the display 200-2 can deal with the moving image data at the high frame rate (120 Hz or 240 Hz) in Step ST3.

When the display 200-2 is not capable of dealing with the moving image data, the control unit decodes only the basic stream STb and transmits the moving image data at the normal frame rate that includes the image data Qb in each frame at the normal frame rate to the set top box 200-1 in Step ST4. The control unit completes the control processing in Step ST5 after this processing in Step ST4.

In addition, when the display 200-2 can deal with the moving image data at the high frame rate in Step ST3, the control unit decodes the basic stream STb and the extended stream STe in Step ST6.

Next, the control unit determines whether or not the display 200-2 has the function of the back mixing processing (mixing release processing) in Step ST7. When the display 200-2 does not have the function of the back mixing processing, the control unit decides that the back mixing processing is performed on the side of the set top box 200-1 and transmits the mixing-released moving image data R at the high frame rate to the set top box 200-1 in Step ST8. The control unit completes the control processing in Step ST5 after this processing in Step ST8.

In addition, when the display 200-2 has the function of the back mixing processing in.

Step ST7, the control unit decides that the back mixing processing is performed on the side of the display 200-2 and sends the moving image data Q at the high frame rate, on which the mixing processing has been performed, and the information (coefficient set) about the mixing rate in each frame to the display 200-2 via the HDMI transfer path in Step ST9. The control unit completes the control processing in Step ST5 after this processing in Step ST9.

FIG. 23 illustrates an outline of processing performed by the transmission apparatus 100, the set top box 200-1, and the display 200-2. In addition, although the image sequence Q output from the pre-processor 102 of the transmission apparatus 100 and the image sequence Q output from the decoder 204 of the set top box 200-1 are the same in the time-series manner, a case in which image quality is different in both the image sequences Q is also included since the image sequences Q are made to pass through a codec. Since the transmission apparatus is similar to that described above in FIG. 4, the description thereof will be omitted here. In a case in which a display 200-2A capable of dealing with the moving image data at the high frame rate (120 Hz or 240 Hz) is connected to the set top box 200-1, the decoder 204 performs the decoding processing on the two streams STb and STe and obtains the moving image data Q, which includes the image data Qb in each frame at the normal frame rate and the image data Qe in each extended frame at the high frame rate, on which the mixing processing has been performed.

In addition, in a case in which the display 200-2A has the function of the back mixing processing (mixing release processing), the set top box 200-1 transmits the moving image data Q and the information (coefficient set) about the mixing rate in each frame to the display 200-2A via the HDMI transfer path. The example illustrated in the drawing illustrates a case in which the display 200-2A includes the post-processor 205 and the display 200-2A has the function of the back mixing processing (mixing release processing). In addition, (a) in FIG. 24 illustrates a state in this case.

In addition, in a case in which the display 200-2A does not have the function of the back mixing processing (mixing release processing), the set top box 200-1 performs the back mixing processing (mixing release processing) on the moving image data Q by the post-processor 200-5 that the set top box 200-1 itself has and obtains the mixing-released moving image data R at the high frame rate. Then, the set top box 200-1 transmits this moving image data R to the display 200-2A via the HDMI transfer path. (b) in FIG. 24 illustrates a state in this case.

In addition, in a case in which a display 200-2B capable of dealing with the moving image data at the normal frame rate (60 Hz) is connected to the set top box 200-1, the decoder 204 performs the decoding processing on the stream ST and obtains the moving image data at the normal frame rate that includes the image data Qb in each frame at the normal frame rate. Then, the set top box 200-1 transmits the moving image data to the display 200-2B via the HDMI transfer path.

The set top box 200-1 transmits the moving image data Q, on which the mixing processing has been performed, and the information (coefficient set) about the mixing rate in each frame to the display 200-2A that can deal with the moving image data at the high frame rate (120 Hz or 240 Hz) and has the function of the back mixing processing (mixing release processing) via the HDMI transfer path as described above.

In this case, the information (coefficient set) about the mixing rate is inserted into and transmitted with the blanking period of the moving image data Q, for example. Here, an HFR blending infoframe newly defined is used.

FIG. 25 illustrates a structure example (syntax) of the HFR blending infoframe, and FIGS. 26 and 27 illustrate content (semantics) of main information in the structure example. The first 3 bytes of this infoframe correspond to a header portion, and information about an infoframe type, a version number, a byte length of data byte is arranged therein.

3-bit information of {frame rate} is arranged from the seventh to fifth bits of data byte 1 (Date Byte 1). The 3-bit information represents a frame rate. For example, "3" represents 120 Hz, and "5" represents 240 Hz. In addition, 1-bit information of {blending_flag} is arranged at the fourth bit of the data byte 1 (Date Byte 1). The 1-bit information represents whether or not the mixing processing with the peripheral image data is to be applied. For example, "0" represents the mixing processing is not to be applied, and "1" represents the mixing processing is to be applied.

In addition, 2-bit information of {temporal_filter_taps} is arranged from the third to second bits of the data byte 1 (Date Byte 1). This 2-bit information is configuration information of the filter used for performing the mixing processing and represents the number of frames used (the number of taps). For example, "0" represents two frames (two taps), and "1" represents three frames (three taps).

In addition, 1-bit information of {first_frame_in_frame-pair_flag (FF)} is arranged at the first bit of the data byte 1 (Date Byte 1). This 1-bit information represents whether or not the frame is the first frame of the frame pair (frame-pair), that is, whether or not the frame corresponds to the normal frame rate). For example, "0" represents that the frame is a frame other than the first frame, and "1" represents that the frame is the first frame.

In addition, 1-bit information of {Synchronized Frame (SF)} is arranged at the 0-th bit of the data byte 1 (Date Byte 1). This 1-bit information represents whether or not it is necessary to perform synchronization processing with the next video frame. For example, "0" represents that it is not necessary to perform the synchronization processing with the next video frame, and "1" represents that it is necessary to perform the synchronization processing with the next video frame.

In addition, 3-bit information of {blending_refresh_distance (BR distance)} is arranged from the seventh to fifth bits of data byte 2 (Date Byte 2). This 3-bit in-formation represents the number of frames (temporal distance) until the temporal linkage of the mixing processing is refreshed without using image data in a temporarily previous frame. For example, "0" represents one frame, "1" represents two frames, and "2" represents three frames.

In addition, 1-bit information of {refresh flag} is arranged at the fourth bit of the data byte 2 (Date Byte 2). This 1-bit information represents whether or not the frame is a frame for which the aforementioned temporal linkage of the mixing processing is refreshed. For example, "0" represents that the frame is a frame for which the mixing refresh is not performed, and "1" represents that the frame is a frame for which the mixing refresh is performed.

In addition, blending ratios (coefficients) for the first to fifth picture frames are arranged from data byte 3 (Date Byte 3) to data byte 7 (Date Byte 7). Here, to which order of data byte the blending ratios are arranged correspond to the number of frames (the number of taps) represented by a field of {temporal filter taps}. For example, "0x 0" represents {0}, "0x1" represents {1/5}, "0x2" represents {1/4}, "0x3" represents {1/3}, "0x4" represents {1/2}, "0x5" represents {2/3}, "0x6" represents {3/4}, "0x7" represents {4/5}, and "0x8" represents {1}.

In the set top box 200-1, information included in the blending information SEI message (see FIG. 13) is used without any processing performed thereon as in-formation other than Synchronized Frame, that is, information of {frame_rate}, {blending_flag}, {temporal_filter_taps}, {first_frame_in_frame-pair_flag}, {blending_refresh_distance (BR distance)}, and {refresh_flag} to be included in the HFR blending infoframe.

FIG. 28 illustrates a configuration example of the set top box 200-1. In FIG. 28, the same reference numerals are given to the parts corresponding to those in FIG. 19. This set top box 200-1 has a control unit 201-1, the reception unit 202, the demultiplexer 203, the decoder 204, the post-processor 205, and an HDMI transmission unit 208.

The control unit 201-1 controls operations of the respective parts in the set top box 200-1. The reception unit 202 demodulates the RF modulation signal received by the reception antenna, acquires the transport stream TS, and sends the transport stream TS to the demultiplexer 203.

The demultiplexer 203 extracts both the basic stream STb and the extended stream STe or extracts the basic stream STb by the PID filtering depending on whether or not the display 200-2 can deal with the moving image data at the high frame rate (120 Hz or 240 Hz).

When the demultiplexer 203 extracts the basic stream STb and the extended stream STe, the decoder 204 performs the decoding processing on the basic stream STb to obtain the image data Qb in each frame at the normal frame rate and performs the decoding processing on the extended stream STe to obtain the image data Qe in each extended frame at the high frame rate. That is, the moving image data Q at the high frame rate, on which the mixing processing of the image data Qb and the image data Qe has been performed, is obtained.

In addition, the decoder 204 extracts the parameter set and the SEI that have been inserted into each access unit that forms the basic stream STb and the extended stream STe and sends the parameter set and the SEI to the control unit 201-1. In this case, the blending information SEI (see FIG. 13) that has the information about the mixing rate is also extracted.

In this manner, the control unit 201-1 can recognize at which rate the image data in each frame of the moving image data Q at the high frame rate after the mixing processing has been mixed with the peripheral image data, obtain the coefficients for the back mixing processing, and satisfactorily control the post-processor 205, which will be described later. In addition, the control unit 201-1 can obtain various kinds of information arranged in the HFR blending infoframe from the blending information SELL when the HFR blending infoframe is transmitted to the display 200-2.

In addition, when the demultiplexer 203 extracts only the basic stream STb, the decoding processing is performed on the basic stream STb, and the moving image data at the normal frame rate that includes the image data Qb in each frame at the normal frame rate is obtained.

In a case in which the display 200-2 can deal with the moving image data at the high frame rate and does not have the function of the back mixing processing, the post-processor 205 performs the back mixing processing (mixing release processing) on the moving image data Q at the high frame rate that has been obtained by the decoder 204 and obtains the mixing-released moving image data R at the high frame rate.

The HDMI transmission unit 208 transmits non-compressed moving image data to the display 200-2 via the HDMI transfer path through communication in accordance with the HDMI. Here, in a case in which the display 200-2 can deal with the moving image data at the high frame rate and does not have the function of the back mixing processing, the mixing-released moving image data R at the high frame rate that has been obtained by the post-processor 205 is transmitted to the display 200-2 via the HDMI transfer path.

In a case in which the display 200-2 can deal with the moving image data at the high frame rate and has the function of the back mixing processing, the moving image data Q at the high frame rate, which has been obtained by the decoder 204, on which the mixing processing has been performed, is transmitted to the display 200-2 via the HDMI transfer path. In this case, since the back mixing processing is performed on the side of the display 200-2, the HFR blending infoframe (see FIG. 25) including the information about the mixing rate is inserted into and transmitted with the blanking period of the image data in each frame that forms the moving image data Q.

In addition, in a case in which the display 200-2 can deal with the moving image data at the normal frame rate, the moving image data at the normal frame rate that includes the image data Qb in each frame at the normal frame rate that has been obtained by the decoder 204 is transmitted to the display 200-2 via the HDMI transfer path.

FIG. 29 illustrates a configuration example of the display 200-2A that deals with the moving image data at the high frame rate. In FIG. 29, the same reference numerals are given to the parts corresponding to those in FIG. 19. The display 200-2A has a control unit 201-2A, an HDMI reception unit 209, the post-processor 205, the MCFI unit 206, and the panel display unit 207. In addition, there is also a case in which the post-processor 205 is not provided.

The control unit 201-2A controls operations of the respective parts in the display 200-2A. The HDMI reception unit 209 receives non-compressed moving image data at the high frame rate from the set top box 200-1 via the HDMI transfer path through the communication in accordance with the HDMI. Here, in a case in which the post-processor 205 is not present, the mixing-released moving image data R at the high frame rate is received.

Meanwhile, in a case in which the post-processor 205 is present, the moving image data Q at the high frame rate, on which the mixing processing has been performed, is received. In this case, the HFR blending infoframe (see FIG. 25) which has been inserted into the blanking period of the moving image data Q is extracted and sent to the control unit 201-2A. In this manner, the control unit 201-2A can recognize at which rate the image data in each frame of the moving image data Q at the high frame rate after the mixing processing has been mixed with the peripheral image data, obtain the coefficients for the back mixing processing, and satisfactorily control the post-processor 205, which will be described later.

The post-processor 205 performs the back mixing processing (mixing release processing) on the moving image data Q at the high frame rate, which has been received by the HDMI reception unit 208, and obtains the mixing-released moving image data R at the high frame rate under the control by the control unit 201-2A.

The MCFI unit 206 performs frame interpolation processing of motion compensation on the moving image data R at the high frame rate, which has been received by the HDMI reception unit 209 or obtained by the post-processor 205, and obtains the moving image data at a further increased frame rate. In addition, there is also a case in which this MCFI unit 206 is not provided. The panel display unit 207 performs image display based on the moving image data R at the high frame rate that has been obtained by the post-processor 205 or the moving image data at a frame rate increased by the MCFI unit 206.

FIG. 30 illustrates a configuration example of the display 200-2B that deals with the moving image data at the normal frame rate. In FIG. 30, the same reference numerals are given to the parts corresponding to those in FIG. 19. This display 200-2B has a control unit 201-2B, an HDMI reception unit 209B, the MCFI unit 206B, and the panel display unit 207B.

The control unit 201-2B controls operations of the respective parts in the display 200-2B. The HDMI reception unit 209B receives non-compressed moving image data at the normal frame rate from the set top box 200-1 via the HDMI transfer path through the communication in accordance with the HDMI.

The MICFI unit 206B performs the frame interpolation processing of motion compensation on the moving image data at the normal frame rate, which has been received by the HDMI reception unit 209B, and obtains the moving image data at the increased frame rate. In addition, there is also a case in which the MCFI unit 206B is not provided. The panel display unit 207B performs image display based on the moving image data at the normal frame rate, which has been received by the HDMI reception unit 209B, or the moving image data at eh frame rate increased by the MCFI unit 206B.

As described above, in a case in which the moving image data Q at the high frame rate, on which the mixing processing has been performed, is transmitted to the display 200-2, the HFR blending infoframe including the information about the mixing rate in each frame is simultaneously transmitted in the transmission and reception system 10A illustrated in FIG. 21. Therefore, the display 200-2 can easily obtain the mixing-released moving image data obtained by performing the back mixing processing on the moving image data Q at the high frame rate on the basis of the information about the mixing rate in each frame and can satisfactorily displays a moving image.

In addition, although the example in which the high frame rate is 120 Hz or 240 Hz and the normal frame rate is 60 Hz has been illustrated in the aforementioned embodiment, the combination of the frame rates is not limited thereto. For example, the same is true to the combination of 100 Hz or 200 Hz and 50 fps.

In addition, although the transmission and reception system 100 that includes the transmission apparatus 100 and the television receiver 200 and further the transmission and reception system 10A that includes the transmission apparatus 100, the set top box 200-1, and the display 200-2 have been illustrated in the aforementioned embodiment, the configuration of the transmission and reception system to which the present technology can be applied is not limited thereto.

In addition, the example in which the container is the transport stream (MPEG-2 TS) has been illustrated in the aforementioned embodiment. However, the present technology can also similarly be applied to a system with a configuration in which distribution to a reception terminal is performed by using a network such as the Internet. In the internet distribution, distribution is performed by using a container of MP4 or another format in many cases. That is, containers in various formats such as a transport stream (MPEG-2 TS), or mpeg media transport (MMT) that have been employed by digital broadcasting standards and ISOBMFF (MP4) that is used in the Internet distribution can be applied as the container.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

A transmission apparatus comprising:
circuitry configured to
perform processing of mixing, at a mixing rate for each frame, a frame of first video data with one or more peripheral frames of the first video data and obtain second video data at a first frame rate,
the second video data including frames corresponding to a second frame rate that is lower than the first frame rate, the frames corresponding to the second frame rate being mixed with the peripheral frames, and
the circuitry is further configured to
encode the frames corresponding to the second frame rate to obtain a basic stream and encode remaining frames of the second video data to obtain an extended stream,
insert information about the mixing rate of corresponding frames into the basic stream and the extended stream in association with the respective frames, and
transmit the basic stream and the extended stream into which the information about the mixing rate has been inserted.

(2)

The transmission apparatus according to (1),
wherein the basic stream and the extended stream have a Network Abstraction Layer (NAL) unit structure, and
the circuitry is configured to insert a Supplemental Enhancement Information (SEI) NAL unit with the information about the mixing rate into the basic stream and the extended stream.

(3)

The transmission apparatus according to (1),
wherein the first frame rate is 120 Hz or 240 Hz, and the second frame rate is 60 Hz.

(4)

The transmission apparatus according to (1),
wherein configuration information of a filter used to perform the mixing processing is included in the information about the mixing rate.

(5)

The transmission apparatus according to (1),
wherein mixing refresh information indicating a number of frames until mixing refresh that does not use a temporally previous frame is performed is included in the information about the mixing rate.

(6)

The transmission apparatus according to (5),
wherein refresh flag information indicating whether or not a respective frame is a target of the mixing refresh is included in the information indicating the mixing rate.

(7)

The transmission apparatus according to (1),
wherein head flag information indicating whether or not a respective frame corresponds to the second frame rate is included in the information about the mixing rate.

(8)
A transmission method comprising:
performing, by circuitry, processing of mixing, at a mixing rate for each frame, a frame of first video data with one or more peripheral frames of the first video data and obtain second video data at the first frame rate,
the second video data including frames corresponding to a second frame rate that is lower than the first frame rate, the frames corresponding to the second frame rate being mixed with the peripheral frames, and
the transmission method further includes
encoding, by the circuitry, the frames corresponding to the second frame rate to obtain a basic stream and encoding remaining frames of the second video data to obtain an extended stream,
inserting, by the circuitry, information about the mixing rate of corresponding frames into the basic stream and the extended stream in association with the respective frames, and
transmitting, by the circuitry, the basic stream and the extended stream into which the information about the mixing rate has been inserted.

(9)
A reception apparatus comprising:
circuitry configured to receive a basic stream and an extended stream, which are obtained by
performing processing of mixing, at a mixing rate for each frame, a frame of first video data with one or more peripheral frames of the first video data and obtaining second video data at a first frame rate, the second video data including frames corresponding to a second frame rate that is lower than the first frame rate, the frames corresponding to the second frame rate are mixed with the peripheral frames,
encoding the frames corresponding to the second frame rate to obtain the basic stream, and
encoding remaining frames of the second video data to obtain the extended stream, information about the mixing rate of corresponding frames is included in the basic stream and the extended stream in association with the respective frames, and
the reception apparatus further includes circuitry configured to, based on a frame rate capability of a display connected to the reception apparatus,
decode the basic stream to obtain frames at the second frame rate or
decode the basic stream and the extended stream to obtain the second video data, and obtain mixing-released video data at the first frame rate by performing back mixing processing on the second video data on a basis of the information about the mixing rate.

(10)
A reception method comprising:
receiving, by circuitry, a basic stream and an extended stream,
which are obtained by
performing processing of mixing, at a mixing rate for each frame, a frame of first video data with one or more peripheral frames of the first video data and obtaining second video data at a first frame rate, the second video data including frames corresponding to a second frame rate that is lower than the first frame rate, the frames corresponding to the second frame rate are mixed with the peripheral frames,
encoding the frames corresponding to the second frame rate to obtain the basic stream, and
encoding remaining frames of the second video data to obtain the extended stream, information about the mixing rate of corresponding frames is included in the basic stream and the extended stream in association with the respective frames, and the reception method further includes, based on a frame rate capability of a display connected to the reception apparatus,
decoding, by the circuitry, the basic stream to obtain frames at the second frame rate, or
decoding the basic stream and the extended stream to obtain the second video data, and obtaining mixing-released video data at the first frame rate by performing back mixing processing on the second video data on a basis of the information about the mixing rate.

(11)
A reception apparatus comprising:
circuitry configured to
acquire second video data obtained by performing processing of mixing, at a mixing rate for each frame, a frame of first video data with one or more peripheral frames of the first video data; and
transmit the second video data and information about the mixing rate in each frame to an external device via a transfer path.

(12)
The reception apparatus according to (11),
wherein synchronization frame information indicating whether or not it is necessary to synchronize with a next video frame is included in the information about the mixing rate.

(13)
The reception apparatus according to (11),
wherein the circuitry is configured to respectively insert the information about the mixing rate in each frame into a blanking period of each frame of the second video data and transmit the second video data.

(14)
The reception apparatus according to (11), wherein the circuitry is further configured to perform back mixing processing on each frame of the second video data on a basis of the information about the mixing rate to obtain third video data,
wherein the circuitry is configured to transmit the third video data instead of the second video data when the external device does not have a function of the back mixing processing.

(15)
The reception apparatus according to (11),
wherein the second video data has a first frame rate,
the second video data including frames corresponding to a second frame rate that is lower than the first frame rate, the frames corresponding to the second frame rate are mixed with the peripheral frames, and
the circuitry is further configured to transmit fourth video data that includes the frames corresponding to the second frame rate instead of the second video data when a frame rate at which display is able to be performed by the external device is the second frame rate.

(16)
A reception method comprising:
acquiring, by circuitry, second video data obtained by performing processing of mixing, at a mixing rate for each frame, a frame of first video data with one or more peripheral frames of the first video data; and transmitting, by the circuitry, the second video data and information about the mixing rate in each frame to an external device via a transfer path.

(17) A reception apparatus comprising:
circuitry configured to
receive second video data obtained by performing processing of mixing, at a mixing rate for each frame, a frame of first video data with one or more peripheral frames of the first video data, and information about a mixing rate in each frame from an external device via a transfer path; and
obtain mixing-released video data by performing back mixing processing on each frame of the second video data on a basis of the information about the mixing rate.

(18) A reception method comprising:
receiving, by circuitry, second video data obtained by performing processing of mixing, at a mixing rate for each frame, a frame of first video data with one or more peripheral frames of the first video data, and information about a mixing rate in each frame from an external device via a transfer path; and
obtaining, by the circuitry, mixing-released video data by performing back mixing processing on each frame of the second video data on a basis of the information about the mixing rate.

The main features of the present technology is that it is possible to easily realize smooth image display by mixing at least the image data in the frame corresponding to the normal frame rate in the image data in each frame that forms the moving image data at the high frame rate with the image data in the peripheral frames to obtain the state in which the aperture ratio is increased, transmitting the basic stream STb obtained by encoding the image data in the frame corresponding to the normal frame rate, and on the reception side, processing the basic stream and obtaining the moving image data at the normal frame rate (see FIG. 4). In addition, it is also possible to easily obtain the mixing-released moving image data at the high frame rate and to satisfactorily display the moving image at the high frame rate on the reception side by obtaining the extended stream STe obtained by encoding the image data in the residual frames along with the basic stream STb, inserting the information (coefficient set) about the mixing rate in the frames into the basic stream STb and the extended stream STe, and transmitting the information therewith (see FIG. 4).

REFERENCE SIGNS LIST 10, 10A transmission and reception system
81 camera
82 HFR processor
100 transmission apparatus
101 control unit
102 pre-processor
102a, 102b delay element
102c, 102c, 102d coefficient device
102f adder
102g frame output switching device
103 encoder
104 multiplexer
105 transmission unit
200, 200A, 200B television receiver
200-1 set top box
200-2, 200-2A, 200-2B display
201, 201-1, 201-2A, 201-2B control unit
202, 202B reception unit
203, 203B demultiplexer
204, 204B decoder
205 post-processor
205a, 205b delay element
205c, 205c, 205d coefficient device
205f adder
205g frame output switching device
206, 206B MCFI unit
207, 207B panel display unit
208, 208B HDMI transmission unit
209 HDMI reception unit

The invention claimed is:

1. A reception apparatus comprising:
circuitry configured to:
receive a container including a basic stream and an extended stream, the extended stream including an encoded subset of frames of first moving image data of a first frame rate and the basic stream including encoded frames of second moving image data of a second frame rate lower than the first frame rate, each frame of the second moving image data representing a mixing of two or more adjacent frames of the first moving image data, and information about a mixing configuration of the mixing being included in the container, the information about the mixing configuration including mixing refresh information indicating a number of frames until a mixing refresh, in which image data in a temporally previous frame is not used;
decode the basic stream to obtain the second moving image data at the second frame rate;
decode the extended stream to obtain the subset of frames of the first moving image data; and
perform unmixing processing on the second moving image data based on the information about the mixing configuration to obtain the first moving image data at the first frame rate including the subset of frames of the first moving image data.

2. The reception apparatus according to claim 1, wherein the basic stream and the extended stream have a NAL unit structure, and
a SEI NAL unit with the information about the mixing configuration is inserted into the basic stream and the extended stream.

3. The reception apparatus according to claim 1, wherein the first frame rate is 120 Hz or 240 Hz, and
the second frame rate is 60 Hz.

4. The reception apparatus according to claim 1, wherein the information about the mixing configuration includes a set of coefficients corresponding to taps of a filter used for the mixing.

5. The reception apparatus according to claim 1, wherein the information about the mixing configuration includes refresh flag information indicating whether or not a frame associated with the refresh flag information is a target of a mixing refresh.

6. The reception apparatus according to claim 1, wherein the information about the mixing configuration includes head flag information indicating whether a frame associated with the head flag information corresponds to the second frame rate.

7. The reception apparatus of claim 1, further comprising:
a display panel,
wherein the circuitry is configured to:
obtain at least one of first moving images from the first moving image data or second moving images from the second moving image data; and cause at least one of the first moving images or the second moving images to be displayed by the display panel.

8. A reception method comprising:
receiving a container including a basic stream and an extended stream, the extended stream including an encoded subset of frames of first moving image data of a first frame rate and the basic stream including encoded frames of second moving image data of a second frame rate lower than the first frame rate, each frame of the second moving image data representing a mixing of two or more adjacent frames of the first moving image data, and information about a mixing configuration of the mixing being included in the container, the information about the mixing configuration including mixing refresh information indicating a number of frames until a mixing refresh, in which image data in a temporally previous frame is not used;
decoding the basic stream to obtain the second moving image data at the second frame rate;
decoding the extended stream to obtain the subset of frames of the first moving image data; and
performing unmixing processing on the second moving image data based on the information about the mixing configuration to obtain the first moving image data at the first frame rate including the subset of frames of the first moving image data.

9. The reception method according to claim 8, wherein
the basic stream and the extended stream have a NAL unit structure, and
a SEI NAL unit with the information about the mixing configuration is inserted into the basic stream and the extended stream.

10. The reception method according to claim 8, wherein
the first frame rate is 120 Hz or 240 Hz, and
the second frame rate is 60 Hz.

11. The reception method according to claim 8, wherein the information about the mixing configuration includes a set of coefficients corresponding to taps of a filter used for the mixing.

12. The reception method according to claim 8, wherein the information about the mixing configuration includes refresh flag information indicating whether or not a frame associated with the refresh flag information is a target of a mixing refresh.

13. The reception method according to claim 8, wherein the information about the mixing configuration includes head flag information indicating whether a frame associated with the head flag information corresponds to the second frame rate.

* * * * *